(12) United States Patent
Segawa

(10) Patent No.: US 9,022,006 B2
(45) Date of Patent: May 5, 2015

(54) METHOD AND DEVICES FOR PROCESS INTENSIFIED WALL INTEGRATED OPERATIONS FOR IC ENGINES

(71) Applicant: Enock N Segawa, Grand Rapids, MI (US)

(72) Inventor: Enock N Segawa, Grand Rapids, MI (US)

(*) Notice: Subject to any disclaimer, the term of this patent is extended or adjusted under 35 U.S.C. 154(b) by 223 days.

(21) Appl. No.: 13/668,287

(22) Filed: Nov. 4, 2012

(65) Prior Publication Data
US 2013/0312699 A1 Nov. 28, 2013

Related U.S. Application Data

(60) Provisional application No. 61/555,833, filed on Nov. 4, 2011.

(51) Int. Cl.
| | |
|---|---|
| *F02M 61/14* | (2006.01) |
| *F02M 29/00* | (2006.01) |
| *F02B 17/00* | (2006.01) |
| *F02M 43/04* | (2006.01) |
| *F02B 1/14* | (2006.01) |
| *F02M 61/18* | (2006.01) |
| *F02M 61/20* | (2006.01) |
| *F02M 51/06* | (2006.01) |

(52) U.S. Cl.
CPC ............... *F02M 29/00* (2013.01); *F02B 17/00* (2013.01); *Y02T 10/128* (2013.01); *F02M 43/04* (2013.01); *F02B 1/14* (2013.01); *F02M 61/14* (2013.01); *F02M 61/20* (2013.01); *F02M 51/061* (2013.01); *F02M 61/1813* (2013.01)

(58) Field of Classification Search
CPC . F02M 43/04; F02M 51/061; F02M 61/1813; F02M 61/14
USPC .......... 123/298, 299, 300, 525, 470, 536, 538
See application file for complete search history.

(56) References Cited

U.S. PATENT DOCUMENTS

| | | | | |
|---|---|---|---|---|
| 2,577,518 | A * | 12/1951 | Guerasimoff | 123/27 R |
| 5,263,316 | A * | 11/1993 | Shekleton | 60/804 |
| 5,966,926 | A * | 10/1999 | Shekleton et al. | 60/39.094 |

* cited by examiner

*Primary Examiner* — Hai Huynh

(57) ABSTRACT

Many IC engine inefficiencies are linked to the relatively low mixture formation rates of current injection methods. Process intensification (PI) is excellent at high mixture formation rates, high mass transfer rates, and short residence times, therefore a wall integrated injection method and device featuring PI has been provided. It allows increased number of injection sites and interfacial surface area between fluid jets and the volume of the squash area, hence high mixture formation rates shorter Liquid Lengths and the use of micro nozzles to further intensify the mixing process by locally mixing fuel and oxidant. This allows high EGR and low compression ratios and better control of HCCI start of ignition. PI effectively achieves thermo and species stratification for extending the load range of the HCCI engine while permitting effective water addition for reciprocating and turbine for lower exhaust heat and less fuel burned hence less CO2 emissions.

15 Claims, 20 Drawing Sheets

A

B

A

B

A

B

C

D

E

F

A

B

A

B

A

B

A

B

C

D

Cross Section F-F

Cross Sectoion H-H

Cross Sectoion K-K

A

B

Figure 1:
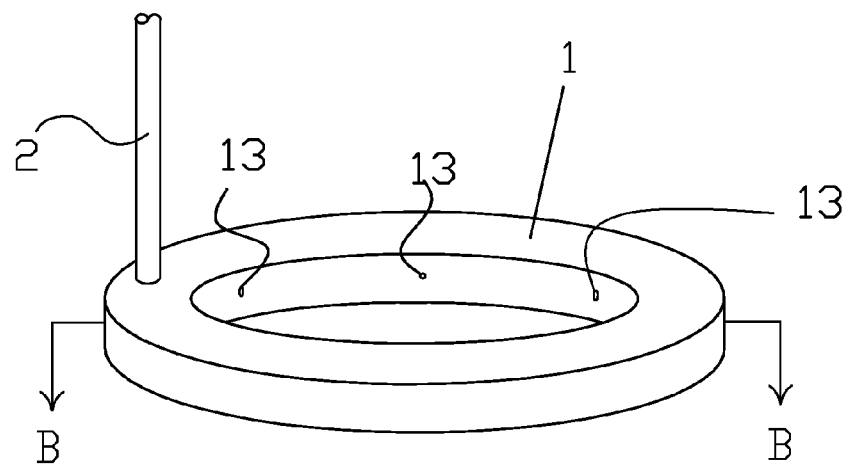

METHOD AND DEVICES FOR PROCESS INTENSIFIED WALL INTEGRATED OPERATIONS FOR IC ENGINES

CROSS-REFERENCE TO RELATED APPLICATIONS

This application is a continuing non-provisional application and claims the benefit of co-pending U.S. provisional patent application Ser. No. 61/555,833 filed on 2011 Nov. 4 by the present inventor, and entitled Process Intensified Wall Integrated Operations and Device(s) for IC Engines, the disclosure of which is incorporated here by reference.

TECHNICAL FIELD

In general this invention relates to internal combustion engine fuel injection and more particularly to improved injection, mixing, combustion and heat evacuation in a combustion chamber.

BACKGROUND

In the last few decades, fuel delivery methods have undergone extensive improvement especially in terms of management and control software. However the hardware and structure of the fuel injection equipment has generally remained unchanged. The dominant injector design for both GDI and CIDI is characterized by a protracted tip which houses the spray holes through which fuel is discharged into the combustion chamber.

There is a great disparity between the size of the injector tip and the volume of the corresponding combustion chamber. The injector tip is not adequate to efficiently discharge and distribute fuel therein at satisfactory rates. Its preferred that the injection process be completed within a few crank angle degrees. This is especially true during transition from part load to full load. To meet this demand, each spray hole necessarily discharges more fuel (by volume $cm^3$) than what would be ideal. This is the inevitable cause of a host of undesirable effects including long fuel jets, excessive liquid lengths, poor droplet distribution, wall wetting, fuel rich regions, poor surface to volume ratio, incomplete combustion, particulate matter, TOG and ROG etc. Another disadvantage to the injector tip is that due to size limitations, it is difficult to make improvements on fuel injector performance.

A superior way of carrying out chemical reactions is found in a relatively new branch in the chemical engineering industry referred to as Process Intensification (PI). "PI allows highly efficient reaction processes with increased selectivity, intrinsic safety, higher yields of the desired products, short residence times, high mass transfer rates, fewer side reactions hence unwanted products and the ability to consolidate multiple processing steps.

The operations of Mixing, Mass transfer (hence injection and combustion), are improved when intensified. PI enhances these operations by dividing them up into a multiplicity of smaller ones which are evenly spaced and localized and having enough of them to add up to or exceed the throughput of the conventional one.

The combustion chambers of heat engines in prior art may be considered batch reactors, in that a group of reagents (nitrogen, oxygen, fuel, argon, EGR, etc.) are all mixed and allowed to react over a relatively long period in order to produce a functional working fluid. In the whole group of reagents, only oxygen and fuel are intended to react. Even though some of the reagents serve a minor role of dilution, their presence results in undesirable side reactions. One example of such side reactions is that between Oxygen and Nitrogen. Engine efficiency is directly proportional to the differential between combustion temperature and the ambient temperature. But traditionally the combustion temperature has been kept below the Nox formation threshold, which happens to be within the same range as material limits. Consequently the artisan has settled for the current batch type combustion for power generation.

SUMMARY

Process Intensification (PI) may be broadly defined as shrinking an operation or chemical reaction. As used herein, it (PI) refers to the act of dividing up conventional IC engine operations of "mixing, injecting, and combustion" into a multiplicity of smaller ones that are evenly spaced and localized and having enough of them to add up to the throughput of the conventional one.

In batch reactors, large quantities of reagents are mixed and allowed to react over long periods with occasional stifling. At the end many side reactions and unwanted products have to be dealt with. On the other hand PI allows highly efficient reaction processes with increased selectivity, intrinsic safety, higher yields of the desired products, short residence times, high throughput, high mass transfer rates, fewer side reactions hence unwanted products and the ability to combine several processing steps into one.

Accordingly, heat engines in prior art may be considered batch reactors, because large amounts of reagents (nitrogen, oxygen, fuel, neon, argon, EGR, etc) are all mixed and allowed to react over a relatively long period in order to produce a working fluid. In the whole group, the only reagents intended to chemically react are oxygen and fuel. The rest of the reagents serve a minor role of dilution but still their presence results in side reactions (some of which are undesirably endothermic), with corresponding emissions like total organic gases, reactive organic gases, CO, NOx etc.

All these problems are attributable to the design of prior art injectors in that they dispense fluids/fuel from a single point (i.e. one injection site commonly referred to as the injector tip where all spray holes are located). It inevitably comprises a very limited surface area. Consequently each spray hole is dedicated to discharge a relatively large amount of liquid fuel, creating the undesirable fuel rich regions which result in poor surface to volume ratio, incomplete combustion, poor emissions and particulate matter etc.

The present invention comprises a large surface area which is used to intensify the operation of mixing, combustion, and transferring fluids into a combustion chamber. The large surface area makes it possible to:

1: Increase the number of injection sites (hence combustion zones) and to evenly spread them out all around the combustion chamber, leaving as little or as much hole to hole separation as may be desired. As shown in the corresponding drawings (FIGS. 1 and 18), this is an "outside in" approach where the fuel/fluid jets originate from the chamber wall towards the center of the chamber or squash area. It is a means to "instant mass transfer" of fluid from all around the chamber to the squash area. The increase in orifice count is also a makes it possible to further reduce the orifice diameter. All these allow shorter Liquid Lengths.

2: Divide up the processes into a multiplicity of localized smaller ones thereby increasing the interfacial surface area between a given volume of fluid/fuel (total volume of fuel/ fluid discharged per injection event) and the volume of gases in the squash area thereby concentrating the mixing process in reduced spaces.

3: Supply multiple fluids (e.g. oxidant and fuel) to the combustion chamber through the same injector.

Figure 10:
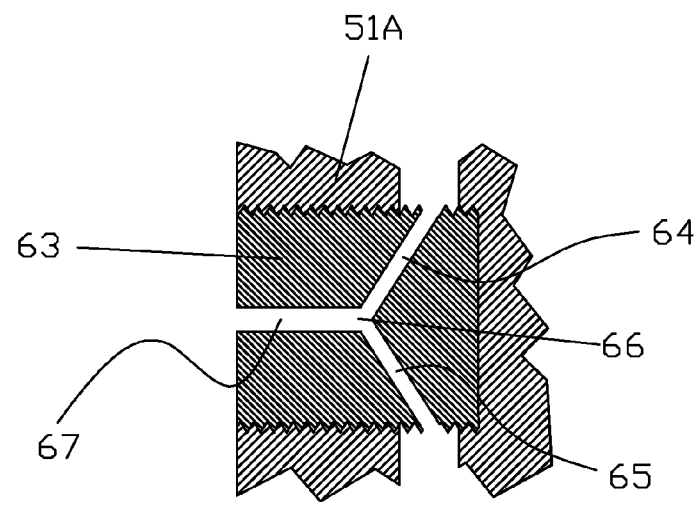
Figure 10:
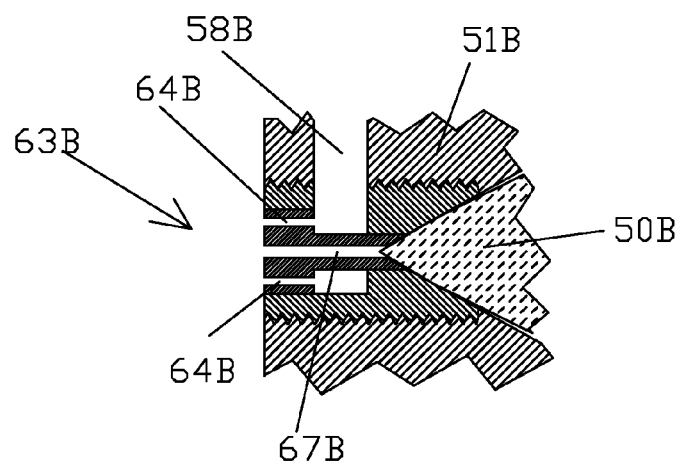
Figure 10:
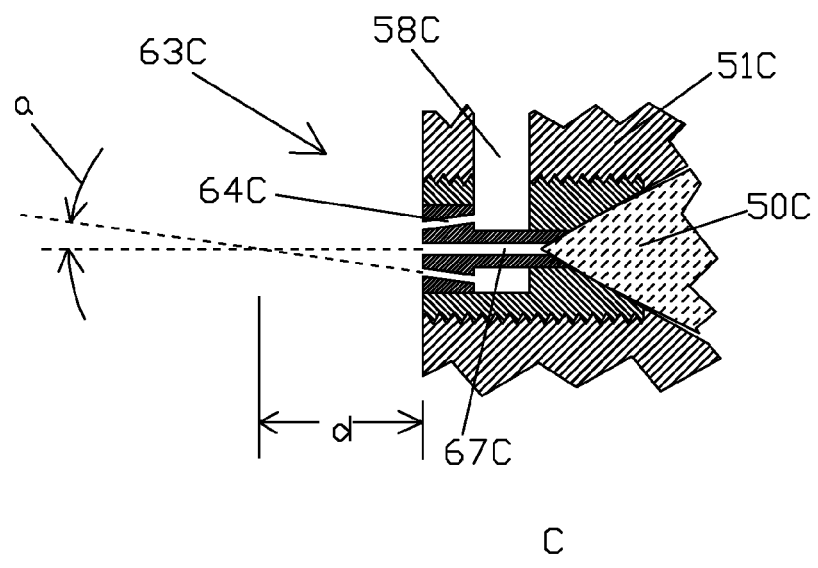
Figure 10:
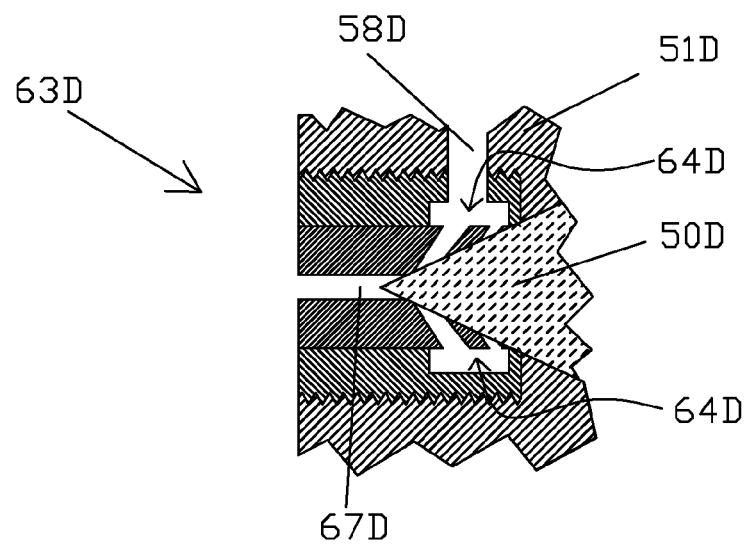
Figure 10:
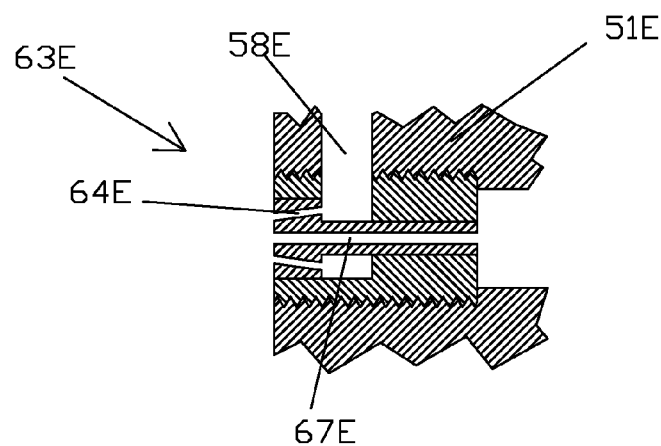
Figure 10:
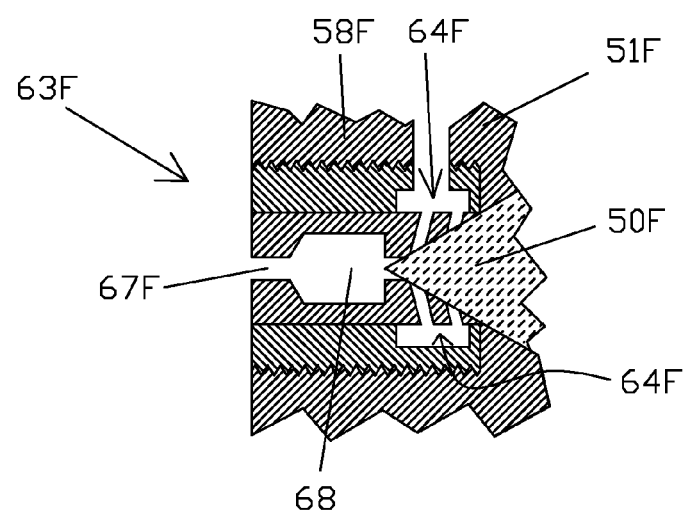

4: Use micro nozzles to intensify the mixing process by locally mixing fuel and oxidant as shown in FIG. 10

ADVANTAGES

The present invention provides:
For a fluid injecting device where the fluid jet trajectory originates from the cylinder wall and flows towards the center of the combustion chamber.
A means for an instantaneous mass transfer of fluid(s) into combustion chamber of reciprocating engines
A Wall Integrated Fluid Injection system for reciprocating engine
For a means for an IC engine to run on 100% EGR
A method to use intensified mixing of fuel and oxidant to reduce and in some cases completely eliminate the compression phase of the internal combustion engine
A means of increasing the power density of turbine engines by eliminating the need for; or at least reducing the size the compressor.
For a means for creating multiple localized oxy-fuel combustion zones in a combustion chamber with very high temperatures and using the water droplets in the water fuel emulsions to absorb the extra heat thereby allowing fuel emulsions with a high water to fuel ratio (including water injection and wet ethanol) to be used without loss of power.
For a Sub Common Rail System for individual cylinders
For a fluid injecting device that's capable of injecting a multiplicity of fluids
For a wall integrated fluid injection system that works in conjunction with prior art injectors as an additional mixture control means.
For a method for easily implementing LTC schemes including GDI, SACI, PPCI, PPC, HCCI, PCCI and CI.
For new combustion schemes including but not limited to SSDI (shielded stratified direct injection).
For stoichiometric pre-mix where fuel and oxidant are premixed prior to injection.
For a means for staged oxidation where fuel is partly mixed with oxidant prior to injection and fully oxidized after injection
For means to integrate several fluid injection processes in one step i.e. premix, +inject+combust.
For an "outside in" direct injection system without wall wetting issues.
For a method to increase the power density of reciprocating engines by providing an efficient Two Stroke Engine.
A method of using water addition to reduce the engine's CO2 emissions.
Other objects and advantages will become obvious in the process of reading this disclosure and practicing the examples herein.

BRIEF DESCRIPTIONS OF DRAWINGS

Figure 2:
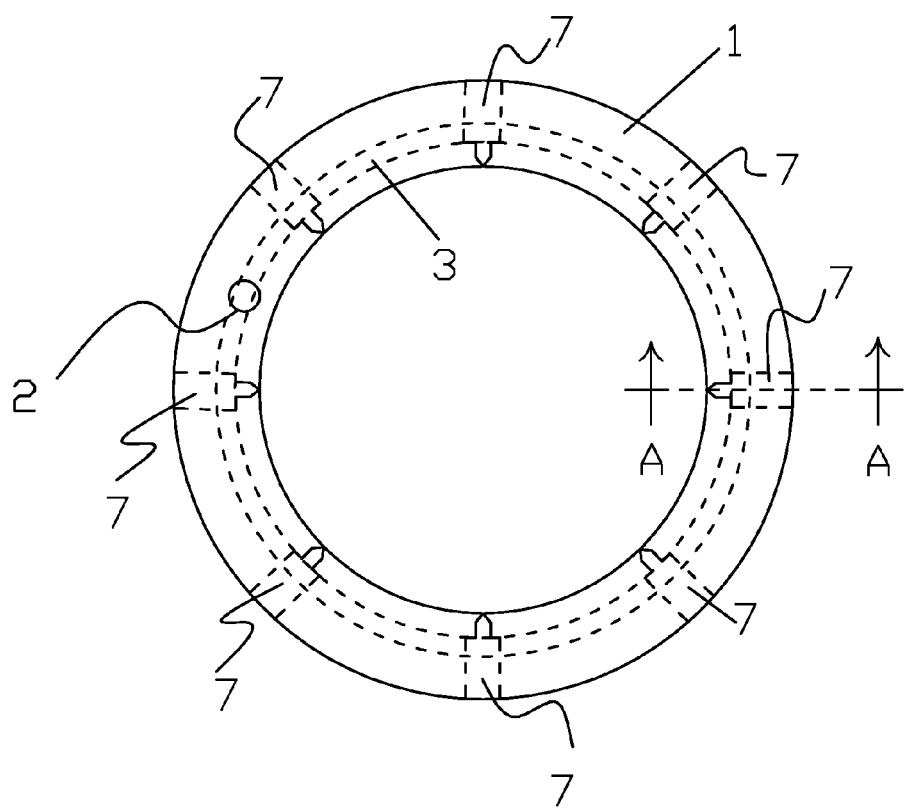
Figure 3:
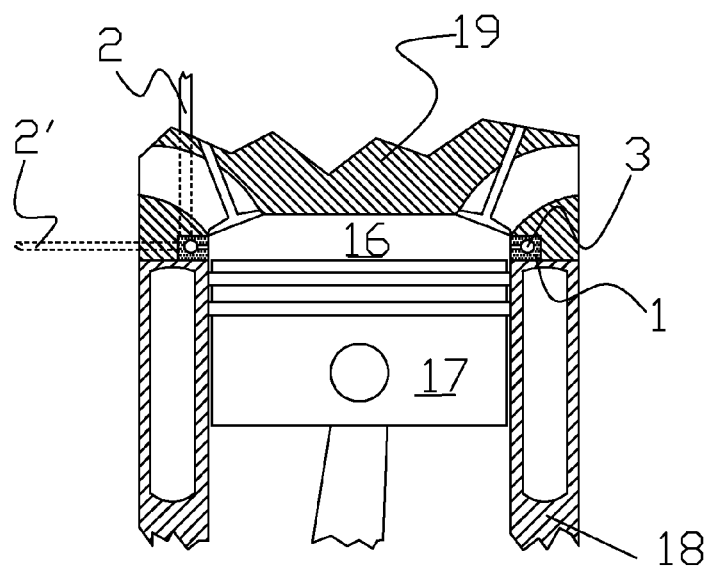
Figure 4:
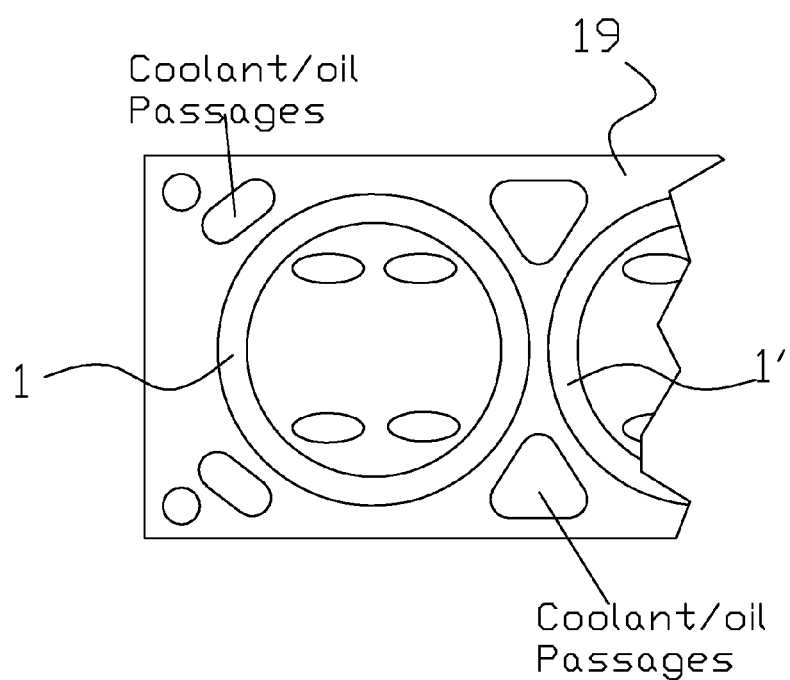
Figure 5:
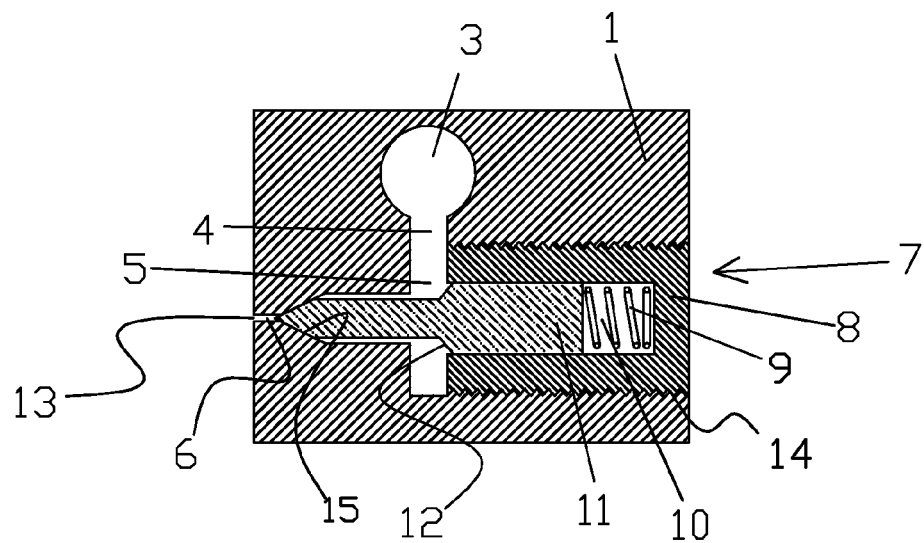
Figure 6:
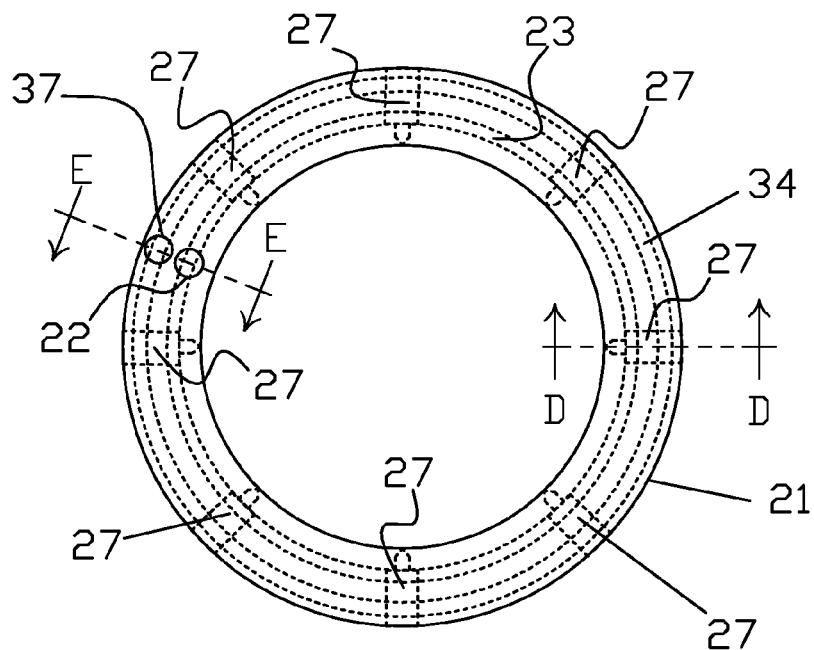
Figure 7:
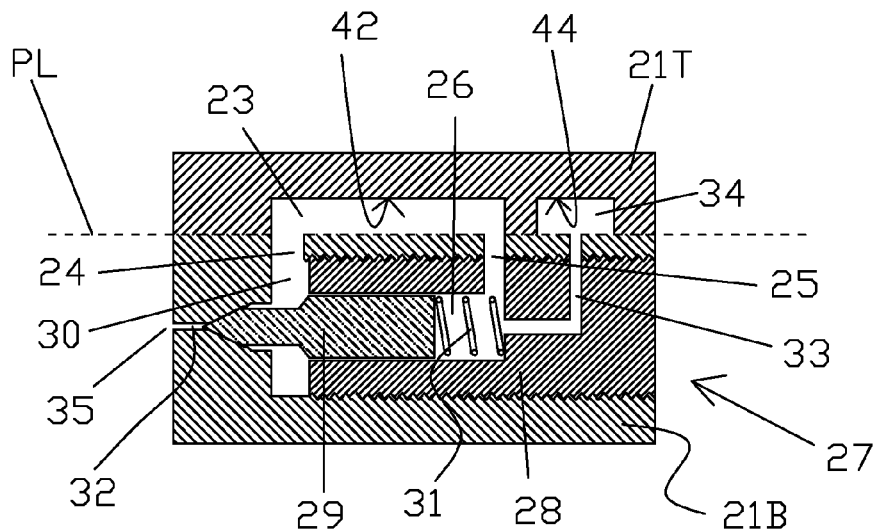
Figure 7:
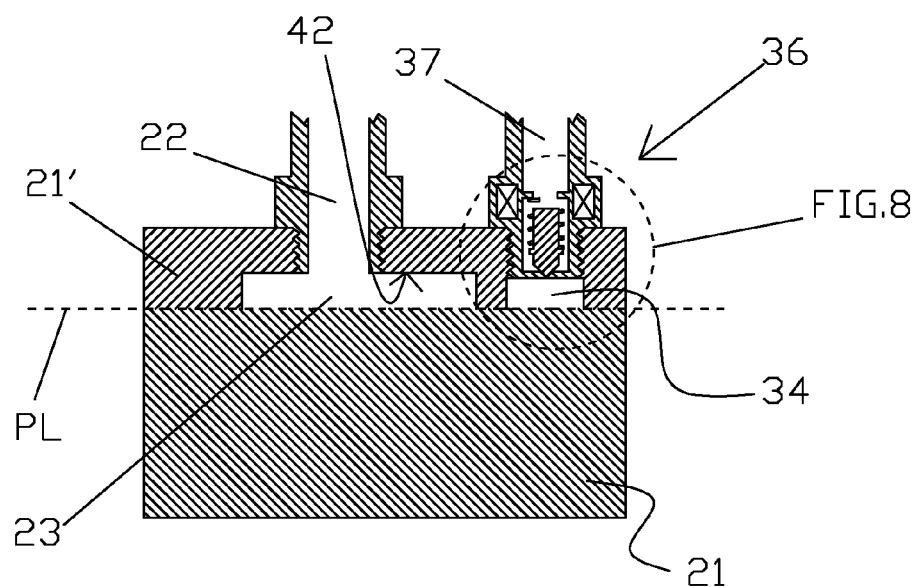
Figure 8:
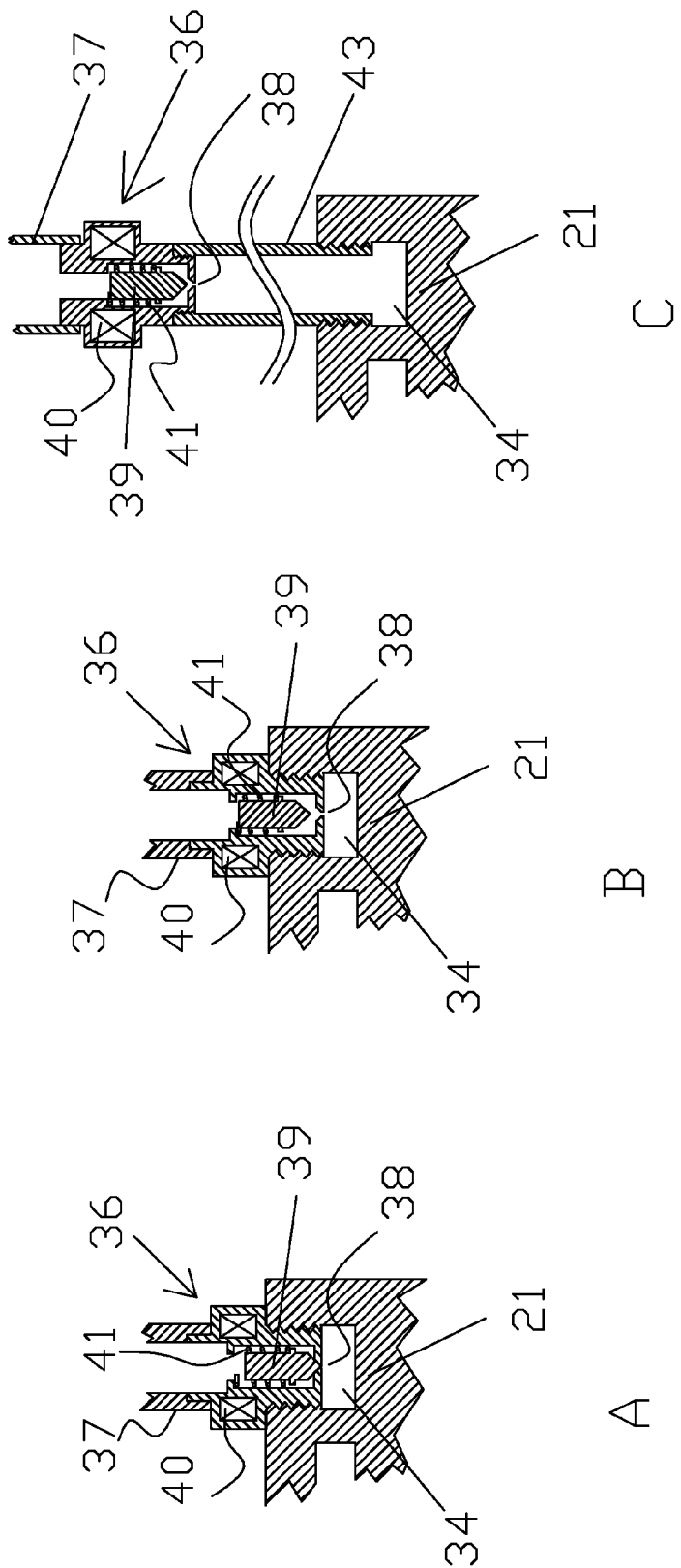
Figure 9:
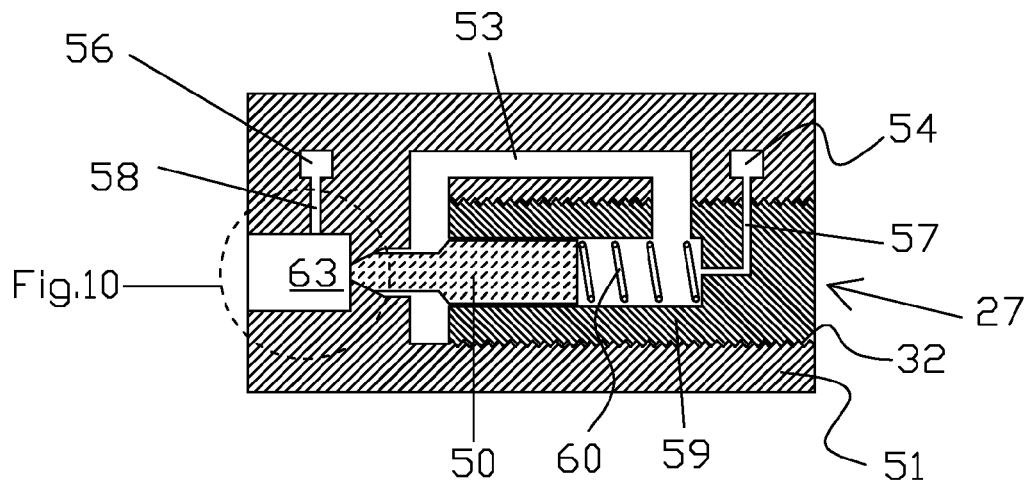
Figure 9:
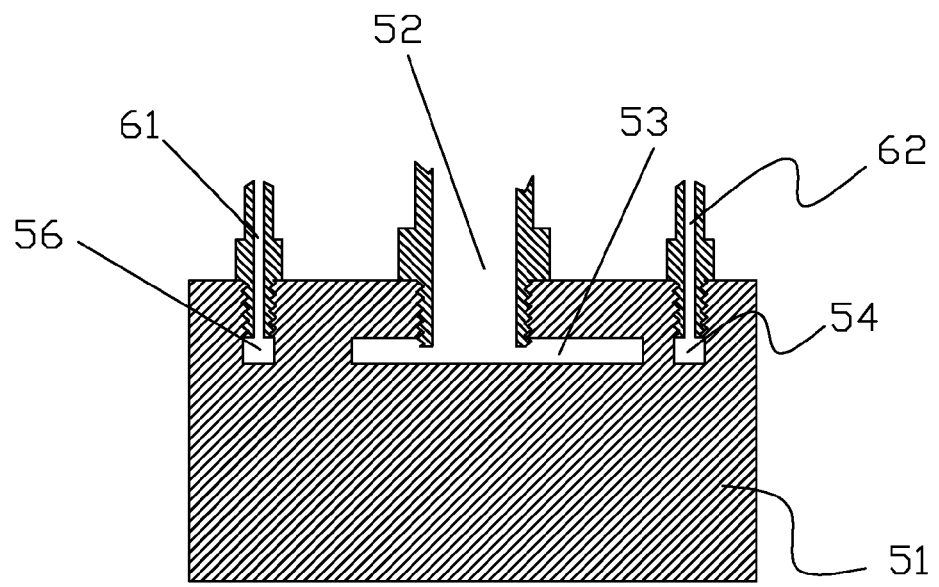
Figure 11:
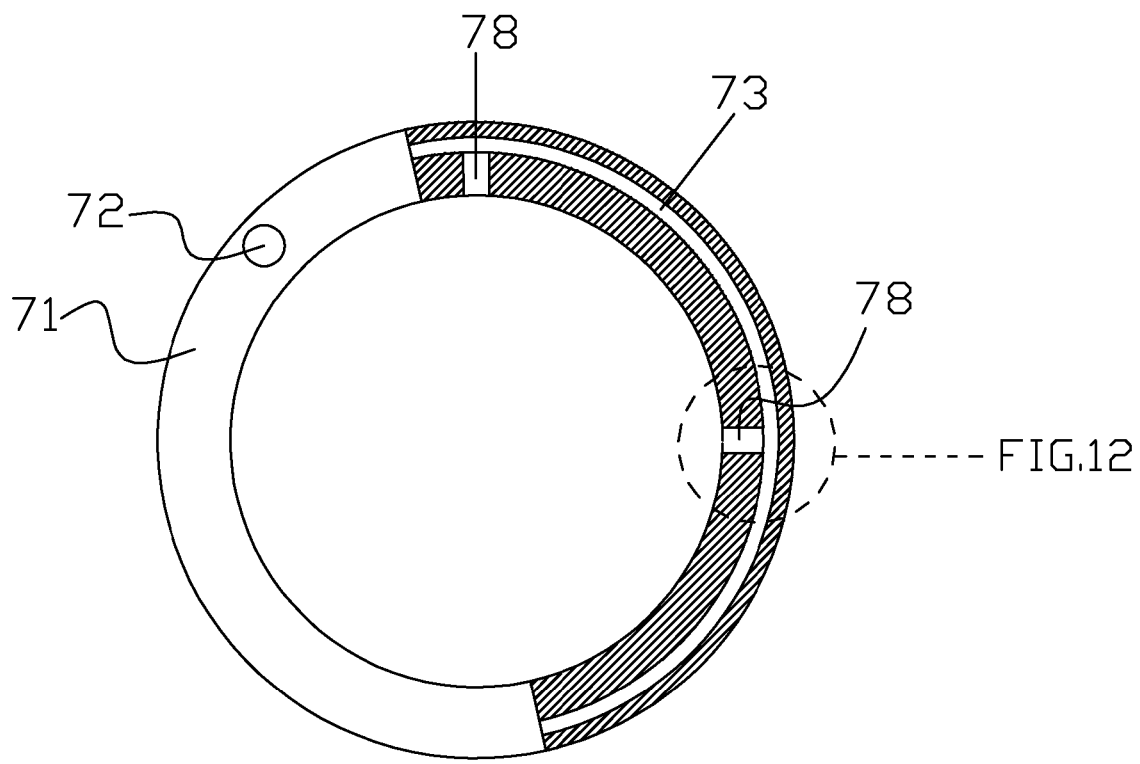
Figure 13:
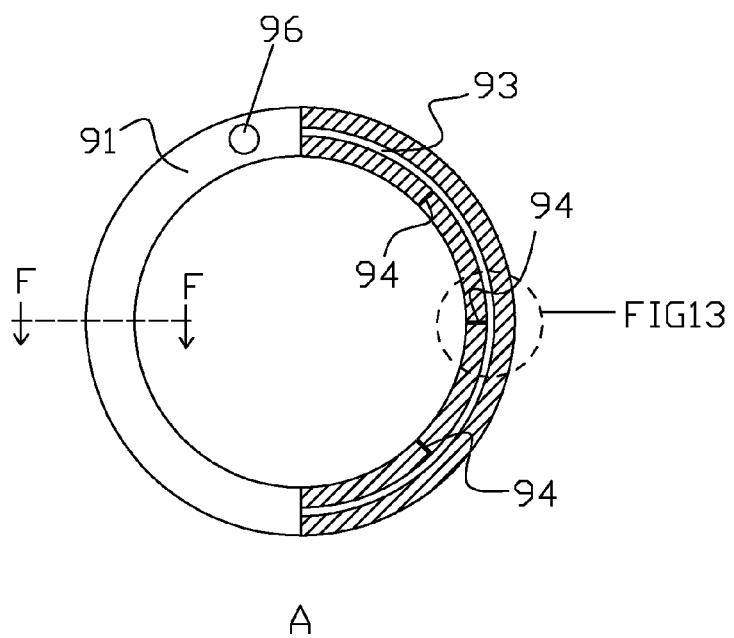
Figure 13:
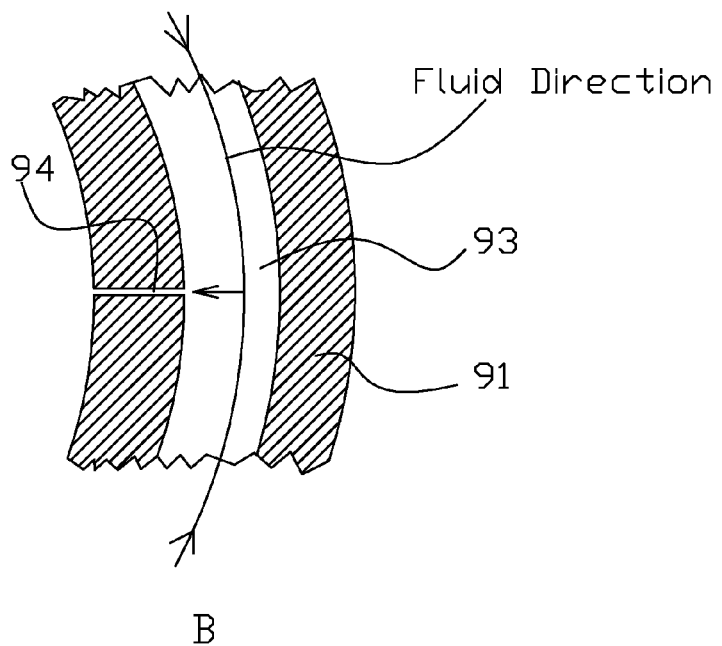
Figure 14:
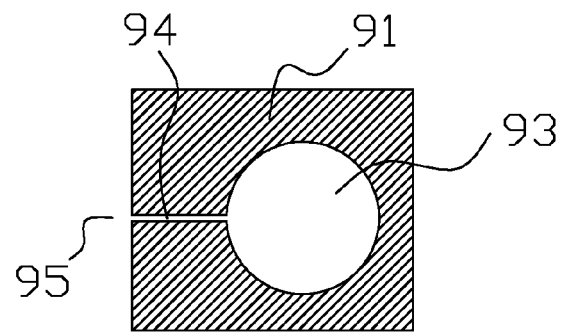
Figure 14:
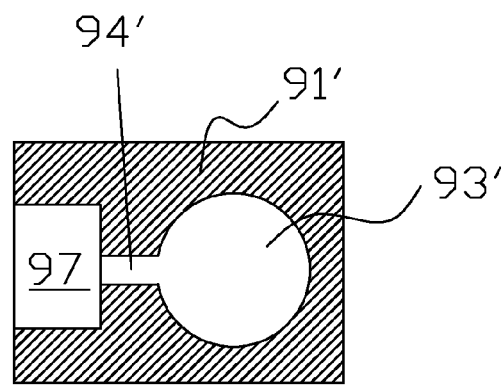
Figure 15:
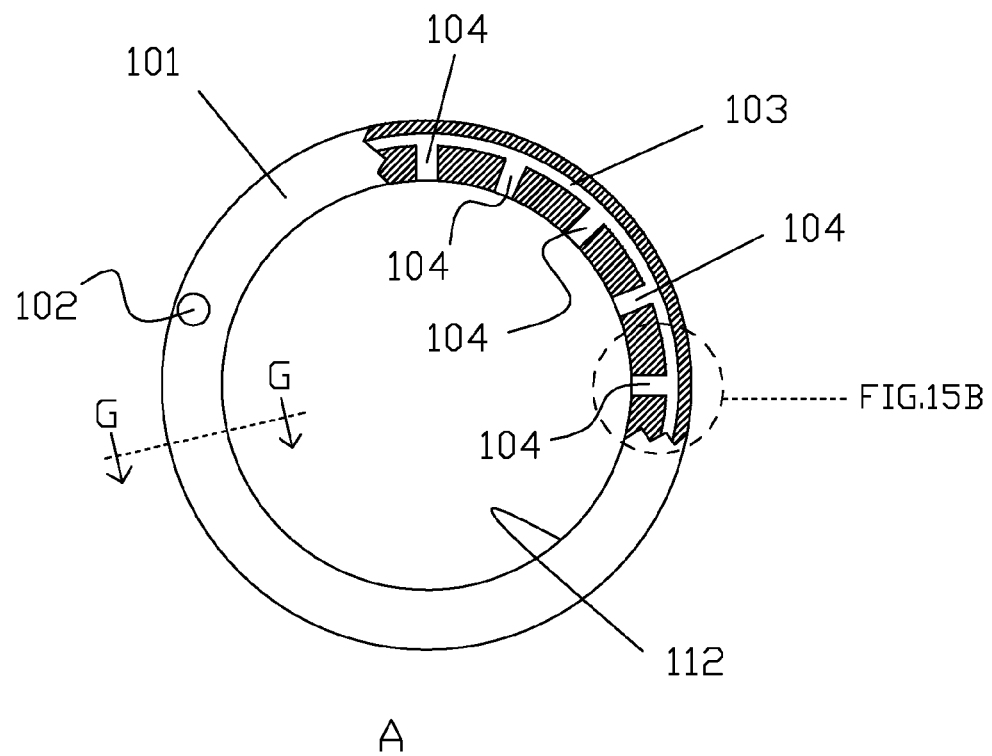
Figure 15:
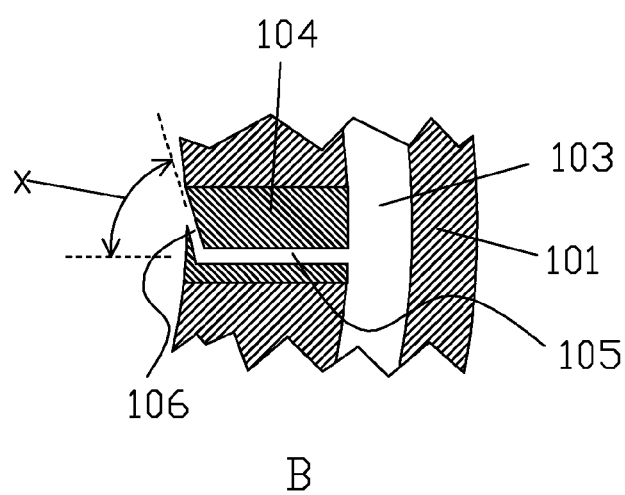
Figure 16:
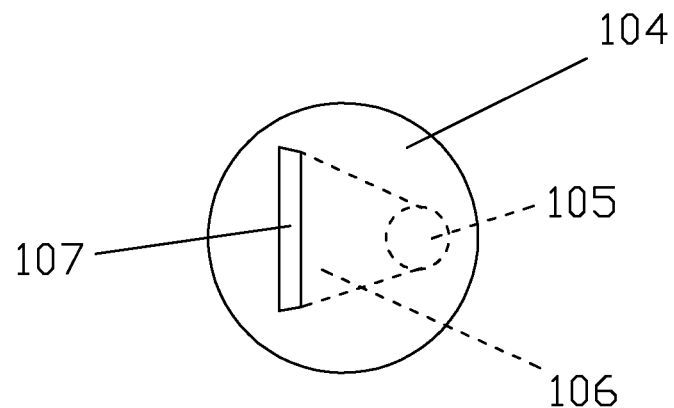
Figure 16:
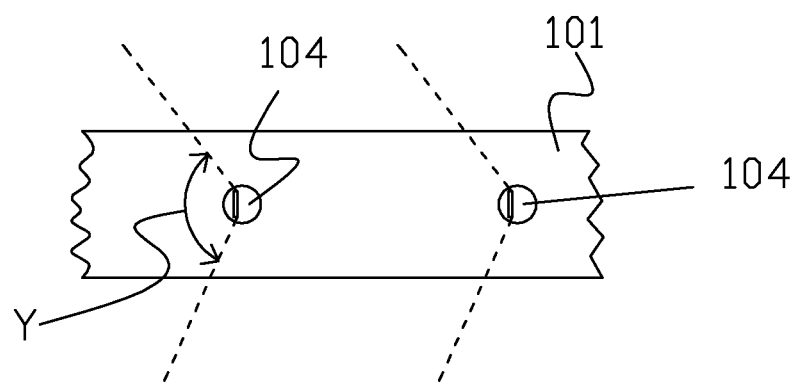
Figure 16:
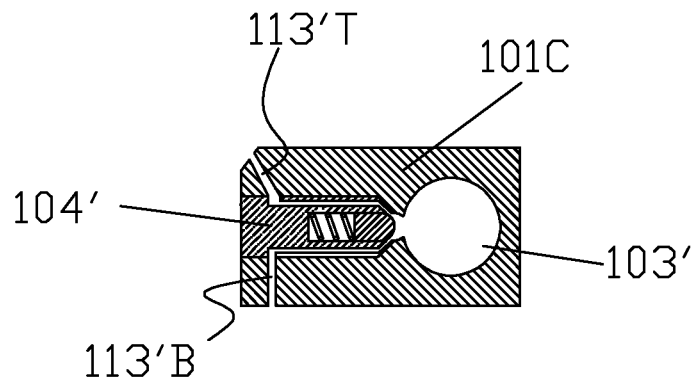
Figure 16:
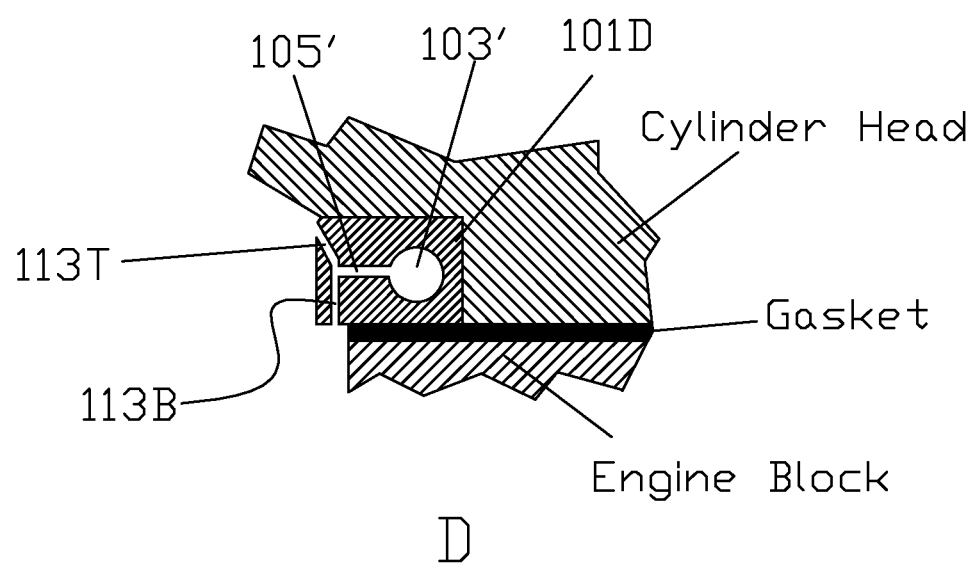
Figure 17:
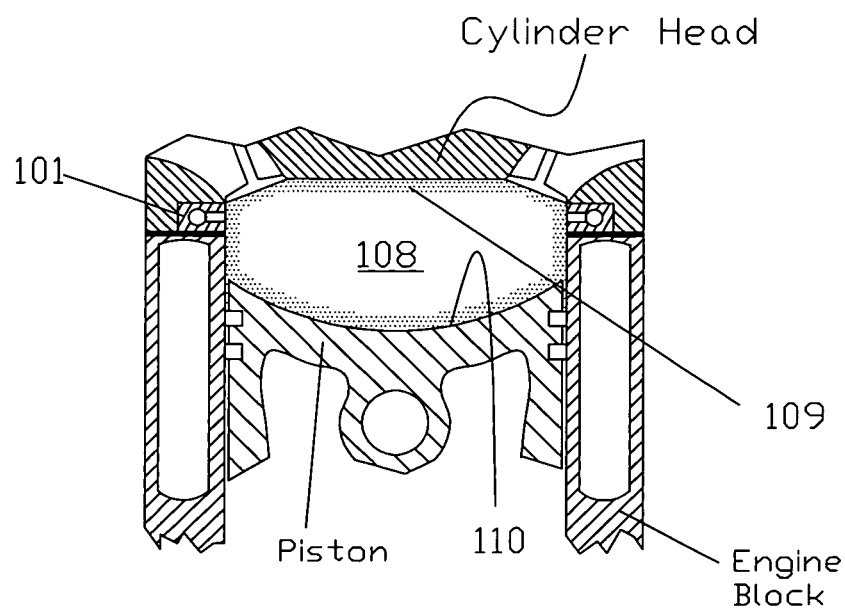
Figure 18:
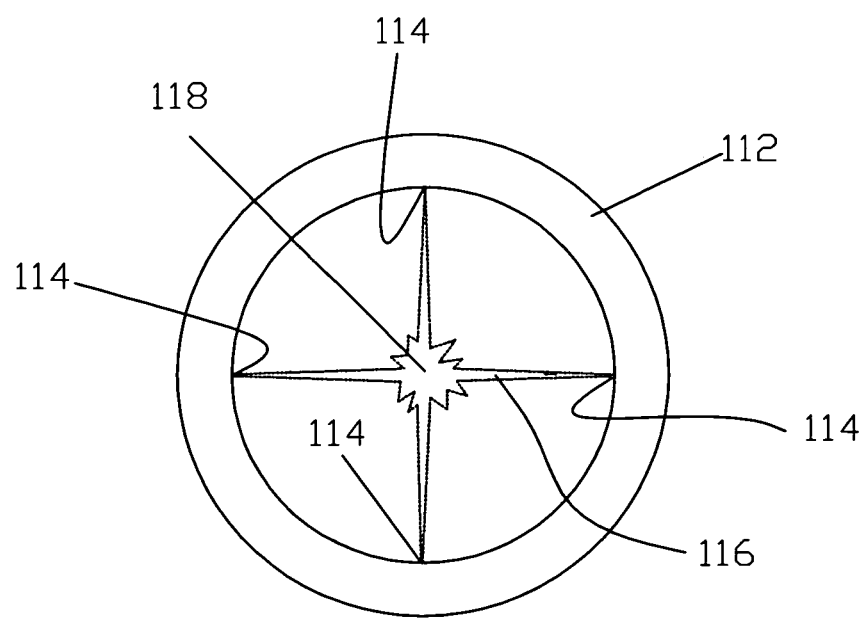
Figure 19:
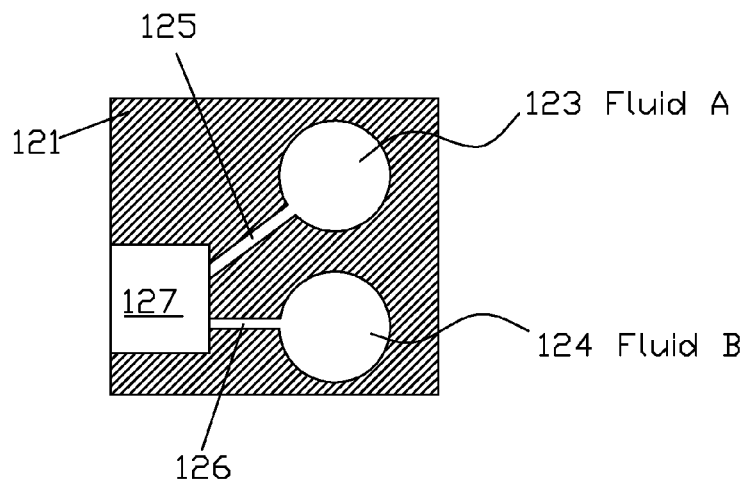
Figure 20A:
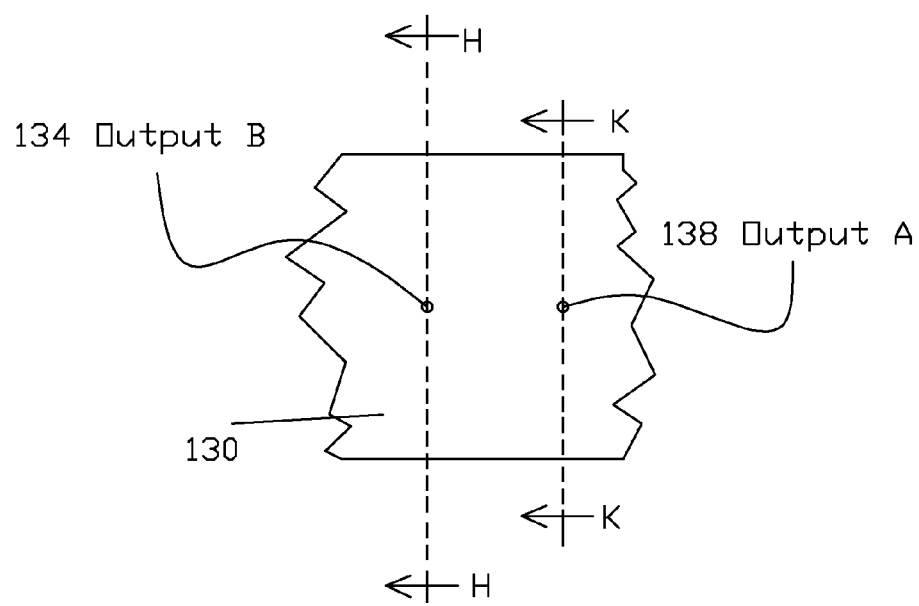
Figure 20B:
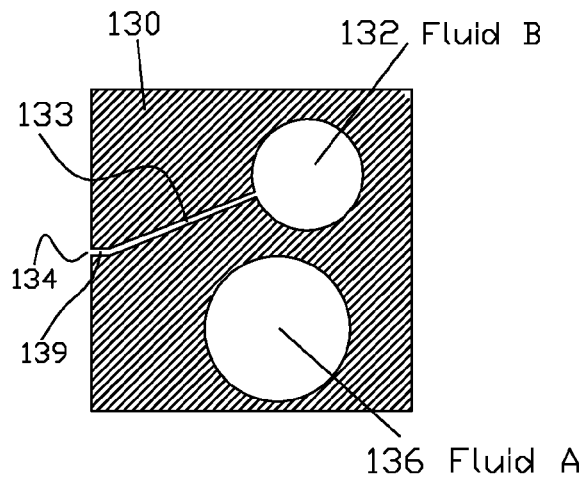

FIG. 1 is a perspective view of the device
FIG. 2 is a top view
FIG. 3 shows the preferred positioning of the device
FIG. 4 shows the underside of an exemplary cylinder head
FIG. 5 Cross section A-A in FIG. 1 showing a one SCR arrangement with controllable valve
FIG. 6 top view of a 2 SCR arrangement with controllable valve
FIG. 7A and 7B show Cross sections D-D and E-E in FIG. 6 respectively
FIG. 8 shows how a solenoid may be integrated with a two SCR arrangement. A—valve closed, B—valve open, C—solenoid separated from the device
FIG. 9 shows a dual fluid three SCR arrangement and a mixing nozzle
FIG. 10 shows different types of nozzles
FIG. 11 shows an arrangement of single fluid one SCR with alternative hydraulic valve
FIG. 12 detailed valve of FIG. 11. A—closed, B—open, C—valve with multiple spray holes
FIG. 13 shows a single fluid valveless arrangement
FIG. 14A is a detailed spray hole 14B shows a spray nozzle added
FIGS. 15 thru 17 is the charge Stratification arrangement. FIG. 15A is top view with partial cross section. 15B is detailed view of a single stratifying nozzle
FIGS. 16A and B is a view from the center of the device. 16A is a single nozzle, 16B shows the pray pattern. 16C shows a hydraulic valve arrangement, 16D shows another valveless arrangement and the preferred positioning
FIG. 17 is a cross section showing gas distribution
FIG. 18 shows how spray jets intersect.
FIG. 19 is Dual fluid Double SCR Valveless arrangement with a mixing nozzle.
FIG. 20 is a dual fluid separate orifice arrangement. 20A as seen from the center, 20B and 20C show cross sections H-H and K-K of FIG. 20A respectively
21A shows the Dual fluid Double SCR arrangement for turbine engines
21B shows the injection device in FIG. 21 in more detail.

DETAILED DESCRIPTION

FIGS. 1 and 2, show the general outside appearance of the fluid injecting device or device. FIG. 1 is the perspective view of the fluid injecting device 1, showing multiple fluid discharging orifices 13 (only three shown). Also shown is the fluid supply line 2 attached to the fluid injecting device 1. FIG. 2 is the top view of the fluid injecting device showing the fluid supply or input line 2 connected to fluid injecting device 1 and is in fluid communication with SCR 3 (shown with broken lines) in the form of a closed loop defined by device 1. SCR 3 is in fluid communication with all micro injectors 7 (also illustrated generically with broken lines). Fluid flows from supply line 2 to SCR 3 to micro injector 7 and discharged through orifices 13.

FIGS. 3 and 4 are an illustration of where and how fluid injecting device 1 may be mounted in the reciprocating engine. Cylinder head 19 may be recessed to accommodate device 1. FIG. 3 is a cross section of an engine block 18 and the cylinder head 19, showing supply line 2, piston 17 and SCR 3. Numeral 2' shows an alternate location of the fluid supply line. Fluid injecting device 1 is mounted in such a way as to form part of the cylinder wall, preferably the top most part so that orifices 13 are aimed to the center of squash area 16. In some cases the orifices may be aimed towards the piston bowl where the jets intersect.

FIG. 4 shows the bottom side of an exemplary and idealized cylinder head 19 and shows fluid injection device 1, secured in the cylinder head 19 by any suitable means. Shown here also are the examples of the usual coolant and oil passages.

FIG. 5 is a single fluid version of the present invention having one SCR. FIG. 5 is cross section A-A of FIG. 2, a cross section thru one of the micro injector assemblies marked by reference numeral 7. As shown, SCR 3 is in fluid communication with fluid gallery 5 through drilling or fluid passage 4. Micro injector assembly 7 is comprised of round/cylindrical housing 8 which has a cylindrical void or opening 10 in its center into which compression spring 9 and needle valve 11 are slidably disposed. As used herein, all these parts will collectively be referred to as micro injectors; and micro injector 7 for the present embodiment. The force of spring 9 on one end of needle valve 11 keeps the tip or front end of needle valve 11 against needle valve seat 15 thereby fluidly isolating gallery 5 from passage 6 hence cutting off fluid flow to spray hole 6. The other end of spray hole 6 forms orifice 13. A suitable sealing means (e.g. O rings etc) may be added between needle valve 11 and the wall of cylindrical void 10 so that fluids do not leak into the area of spring 11. To initiate injection, the fluid pressure in supply line 2 (not shown) is raised above that of spring 9 and consequently the pressure in gallery 5 pushes against shoulder 12 of needle valve 11, forcing it against spring 9 hence making the tip pull away from the beginning part of spray hole 6 hence allowing the fluid from gallery 5 to go through opening 6 to be discharged through orifice 13 to the squash area 16 (shown in FIG. 3). Valve 7 may be secured in device 1 by any suitable means, in this illustration; it is secured by threads 14.

FIGS. 6, 7 and 8 depict a "double" SCR embodiment where the opening and closing of valves is electronically controlled allowing for a more precise metering of the fluids. It's a single fluid double SCR. SCR 23 is the fluid supply rail and SCR 34 is the return or leak off rail.

In FIG. 6, dashed lines are used to show the SCRs and micro injectors inside fluid injecting device 21. Fluid is supplied via high pressure tube/line 22, which is in fluid communication with SCR 23 which in turn is in fluid communication with input side of all micro injectors 27(shown in FIG. 7). All output passages 33 (shown in FIG. 7) of micro injectors 27 are in fluid communication with SCR 34 which in turn is in fluid communication with solenoid 36 (shown in FIG. 7) which in turn is in communication with low pressure line 37 via which fluid returns to reservoir or tank (not shown).

Now referring to FIGS. 7A and 7B; FIG. 7A is cross section D-D of FIG. 6, a cross section through one of the micro-injectors. This description is the same for all micro-injectors 27. As shown here, SCR 23 has a pair of outlets/passages 24 and 25. Outlet or passage 24 is in fluid communication with gallery 30 and outlet/passage 25 is in communication with chamber 26. Fluid in SCR 23 is under pressure and consequently pressure in gallery 30 is in balance with that of chamber 26. The force of spring 31 keeps needle valve 29 to be extended and thereby fluidly isolating gallery 30 from passage 32 hence cutting off fluid communication between gallery 30 and spray hole 32 (hence spring 31 makes this micro-injector 27 a Normally Closed type of valve). When solenoid 36 is energized, a small volume of fluid flows from SCR 34 past solenoid 36 and the pressure in common rail 34 is reduced causing the pressure in passage 33 to reduced, causing the pressure in chamber 26 to be less than that of gallery 30. This imbalance causes needle valve 29 to move towards chamber 26 against spring 31 and as it does, its tip moves away from spray hole 32 thereby allowing fluid in chamber 30 to pass thru spray hole 32 to be discharged thru orifice 35 and into the squash area of the combustion chamber.

FIG. 7B is cross section E-E of FIG. 6. Supply line 22 is connected to Device 21 and is in fluid communication with SCR 23 which supplies incoming fluid to all micro injectors 27 via passages 24 and 25. Second SCR 34 is in fluid communication with all fluid passage 33 of all micro injectors 27. SCR 34 is connected to solenoid valve 36 which in turn is connected low pressure fluid line 37 which may be referred to as the leak off or returning line.

Fluid lines 22 and 37 are in proximity with each other for ease of description but they may be in different locations on fluid injecting device 21.

FIG. 7 is being used as demonstration of an easy way to make the SCRs in this invention. The fluid injecting device 21 is shown comprised of two pieces 21 and 21'. The partitioning line labeled "PL" is the suggested dividing line between the two pieces, for ease of manufacture. As can be seen the SCR's are made by first making grooves 42 and 44 in the at least one of the pieces, and then the pieces are attached by any suitable means. In this example, groove 42 forms SCR 23 and groove 44 forms SCR 34

FIG. 8 is a more detailed illustration of the exemplary electronic control means, a solenoid denoted by numeral 36 which comprises needle valve 39, magnetic coil 40 and spring 41. FIG. 8A shows solenoid in its closed state. Coil 40 is de-energized and spring 41 is exerting force on needle valve 39 thereby keeping its tip into orifice 38 hence no fluid in SCR 34 from flowing through orifice 38. In FIG. 8B, coil 40 is energized and its electromagnetic force attracts needle valve 39 overcoming the force of the spring 41 and the tip of needle valve 39 is pulled away from orifice 38 thereby allowing fluid from common rail 34 to flow through orifice 38 past solenoid 36, whose other end is in fluid communication with low pressure line 37 which leads to tank or reservoir (not shown).

FIG. 8C depicts another arrangement where the electronic valve control means 36 is removed/separated from fluid injection device by conduit 43. This separation from a high temperature area allows for use of less heat resistant solenoids and or other non-heat resistant electronic metering devices like piezo-electric materials etc.

FIGS. 9A and B depict a "Three" SCR version of the present invention. It's the same as cross sections D-D and E-E of FIG. 6 but with three SCR's and mixing nozzle. The fluid injection device 51 comprises three separate SCRs. The structure and operation hereto is the same as described above. So only the additional parts are described here and these are SCR 56, nozzle 63, supply line 61 and fluid passage 58. Fluid supply line 61 is in fluid communication with SRC 56 which also is in fluid communication with fluid passage 58 and this in turn is in fluid communication with the fluid input of generic nozzle 63. Six different nozzles 63A thru 63F are shown in more detail in FIG. 10.

FIGS. 10A thru F illustrate six exemplary micro nozzles used to intensify and localize the process of mixing oxidant and fuel.

The nozzles herein are intended to reduce over-penetration and to keep the operations of injection, mixing and combustion localized therefore injection pressures should be selected accordingly. Various other types of nozzles including those with integrated check valves, flat fan, hollow and solid cone et cetera may all be used wherever desired in the present invention. Specialty nozzles by companies like "The Lee Company" (web: www.theleeco.com) and Ikeuchi USA, Inc. (web: www.ikeuchiusa.com) among others, may be adopted for the present invention.

FIGS 10A depicts a basic nozzle that may be used in the intensified fluid (pre)mixing of the present invention. In micro-reactor technology, this arrangement of channels falls in the "T" category of mixers where fluid passages 64, 65 and 67 are arranged in the form of letter "T". In this invention, fuel and oxidant are fed into Input passages 64 and 65 in opposite direction under equal pressure, meeting at junction 66 and are both forced into passage 67 where they mix and exit nozzle 63 as a mixture of both fluids. In this drawing the passages are arranged more like a "Y" than a "T", for the purpose of confining the mixing action in the mixing passage 67 as opposed to either one of the input passage 64 or 65.

In regard to 10B, passage 58B is in fluid communication with a plurality of spray holes 64B (only two shown). Spray hole 67B (for first fluid e.g. fuel) is surrounded by spray holes 64B (second fluid e.g. oxidizer) in a coaxial manner. All spray holes are parallel to each other. Upon injection, the fluid from spray holes 64B (e.g. oxidant) surrounds the fluid from spray hole 67B (e.g. fuel), forming a localized mixture which is ignited by the heat of the gases in the squash are, thereby creating a localized and shielded oxy-fuel combustion.

FIG. 10C depicts an alternative arrangement where the jets from spray holes 64C converge at angle "a" and at distance "d" in front of the nozzle 63C. Note that angle "a" and distance "d" are variables depending on the type of engine, fuel and other factors. Upon injection, the fluids from spray holes 64C and 67C mix as they pass thru the intersection of their trajectories. Each nozzle 63C of the fluid injecting device 51C may have its own point of intersection for the fluids. But if desired, all the nozzles may have all their intersections at a single point inside the chamber (e.g. the center of the squash area or inside the piston bowl). Such may be the case for the above mentioned SSDI or Shielded Stratified Direct Injection.

FIG. 10D illustrates Nozzle 63D with two extra functions. First, it allows both fluids to be cut off by the same needle valve 50D. Second it allows the fluids to Pre-mix before being injected into the combustion chamber. As shown, spray holes 64D terminate in the counter sunk area of the micro injector 63D and the tip of needle valve 50D sits against their orifices. As shown, spray holes 64D may be slanted towards the combustion chamber in order to improve fluid flow. When needle valve 50D opens (as described above), the pressurized fluids intermix as they flow thru spray hole 67D.

Some of the applications that benefits form this arrangement include Low compression, 100% EGR, Two stroke etc. All of these applications are made possible by "Intensified Mixing and injection of fuel and oxidant.

In regard to FIGS. 10E and 10F, only the modifications will be discussed here since the structure is the same as that in 10C and 10D respectively.

FIG. 10E depicts another coaxial nozzle 63E which may be used anywhere Nozzles are mentioned in this description but more preferred to be used in the constant combustion valveless embodiments. As shown, nozzle 63E receives two fluids which get discharged into the combustion chamber via spray holes 64E and 67E.

FIG. 10F shows the micro chamber embodiment of the present invention. The operation is the same as that of FIG. 10D except that spray hole 67F is preceded by auxiliary chamber or micro chamber 68. As used herein, it will be referred to as Micro chamber where fuel and oxidant mix/combust. Micro chamber 68 serves in staging applications e.g. staged combustion or staged mixing.

FIG.11 depicts a variation of the micro injector assemblies depicted in FIG. 2 in that the opening and closing of the valve is accomplished by varying the pressure in the supply line. Fluid injecting device 71 is shown part full and part cross section. The cross sectional area is in the same direction as that of line B-B in FIG. 1. Only two micro injectors 78 are shown but as many as needed may be used. Fluid is supplied via supply line 72 which is in fluid communication with SCR 73 which in turn fluidly communicates with the fluid input of micro valves 78 (shown in FIG. 12).

Figure 12:
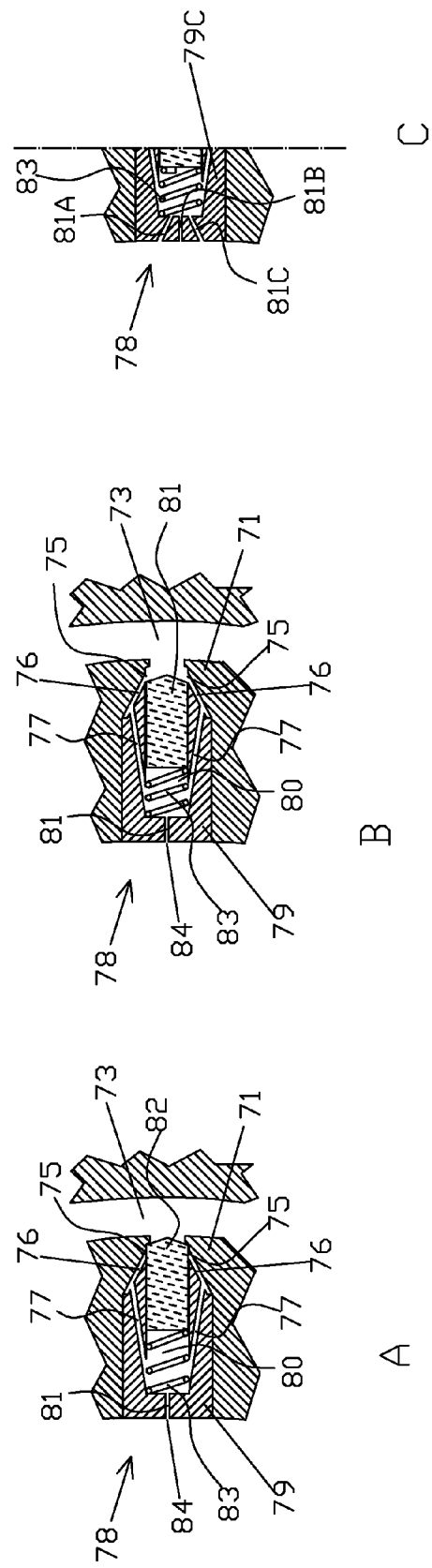

FIG. 12 is a detailed depiction of micro injector 78. 11A shows it in its closed state. Needle valve 82 is reciprocatively disposed in the cylindrical opening 80 of shale or cylindrical housing 79. As shown spring 83 is extended pushing needle valve 82 backwards (towards SCR73) past entrance or openings 75 thereby cutting off fluid communication between SCR73 and fluid passages 76.

FIG. 12B shows micro injector 78 in its open state after fluid pressure is increased above that of spring 83. Needle valve 82 is forced by fluid pressure against spring 83, thereby exposing port 75 hence allowing fluid to flow from common rail 73 through openings 75 thru passage 76 thru a multiplicity of drillings, passages 77 to cylindrical opening 80 thru spray hole 81 past orifice 84 where its discharged into the combustion chamber.

FIG. 12C is showing micro injector 78 with a modified cylindrical housing 79C in that instead of one spray hole, it has a multiplicity of spray holes. Shown in this particular example are three spray holes 81A, 81B and 81C in the same plane. This is for cases where even more spray holes are required.

FIG. 13 is an illustration of a version of the present invention where injection the fluid injection device is being merely as used as an attachment to a prior art injector located upstream. Therefore fluid injecting device 91 is without any sub-parts like valves, micro-injectors. But if desired, a nozzle may be added as shown in FIG. 14B. The metering means may be a modified commercial injector upstream whose output is in fluid communication with the fluid input/supply line 96. Alternatively the injector may be adopted to be directly screwed to device 91 in the same way as the fluid supply lines of the preceding embodiments.

FIG. 13A is showing a partial sectional view of fluid injecting device 91. The cross sectional area is in the same direction as that of line B-B in FIG. 1. Supply line 96 is in fluid communication with SCR 93 which is in fluid communication with a multiplicity of spray holes 94 through which fluid is discharged into the combustion chamber or squash area. As shown, spray holes 94 is simply a drilling. FIG. 13B is simply a more detailed depiction of the connection between SCR93 and an individual spray hole in FIG. 13A.

FIG. 14A is cross section F-F of FIG. 12. SCR 93 is fluidly communicating with spray hole 94 which forms orifice 95. Both SCR93 and drilling/spray holes 94 being defined by the solid body of fluid injecting device 91.

FIG. 14B is showing an alternative arrangement for cases where more precise and particular spray patterns are desired. It is the same in structure and operation as 14A except for the addition of nozzle 97; (as mentioned above any suitable micro-nozzle may be used). SCR 93' is fluidly communicating with fluid passage 94' which in turn is in fluid communication with nozzle 97 which may be secured in solid body 91' by any suitable means like welding, threads etc.

FIGS. 15, 16 and 17 depict a thermo and species stratification version of the present invention.

In reference to FIG. 15A, shown is a partly sectional view of fluid injecting device 101. FIG. 15B shows a magnified connection of nozzle 104 and passages 103, 105 and 106. The fluid is supplied via supply line 102 which is in fluid communication with SCR 103 which in turn is fluidly communicating with fluid passage 105 of nozzle 104. Passage 105 is communicating with spray hole 106. The axis of spray hole 106 is at angle "X" with respect to the axis of passage 105 which is such that the injected fluid is sprayed not in the center of the combustion chamber, but onto the inside diameter 112 of the fluid injecting device 101 and the cylinder wall. The preferred spray pattern of nozzle 104 is the flat fan type which allows much of the cylinder wall to be sprayed as shown in FIG. 16B.

FIG. 16A is the front view of nozzle 104 showing passages 105 and spray hole 106 shown in broken lines. As shown, orifice 107 is rectangular as opposed to circular for a flat like spray pattern.

FIG. 16B is a portion of the injection device 101 as viewed from its center showing a number of nozzles 104 and the preferred spray pattern which is flat fan wide angle denoted by letter "Y".

FIG. 16 C is cross section G-G of FIG. 15, an arrangement using micro valve 104'. The structure and operation hereof is the same as that in FIG. 12 and therefore will not be repeated here except for the differences i.e. spray holes 113'T for spraying the top part of the combustion chamber and 113'B for spraying the bottom part of the cylinder.

FIG. 16 D is an alternative arrangement of this embodiment i.e. without valves. For more clarity, portions of cylinder head, gasket and engine block are shown and they're all labeled accordingly. The absence of valves makes it possible to reduce the size of this version of the Intensifies fluid injection. SCR 103' is in fluid communication with a plurality of passages 105' each of which splits into two spray holes namely 113T for spraying the top part of the cylinder and 113B for spraying the bottom part of the cylinder.

FIG. 17 shows a cross section of an engine according to this invention showing the "desired fluid distribution 109" originating from fluid injecting device 101. The piston crown 110 may be carved out in the center as shown so as to promote as much of a spherical squash area 108 as possible.

FIG. 18 depicts the "Non-radial" DI embodiment of the wall integrated Intensified fluid injection showing fluid injecting device 112 with four opposed orifices 114. Its also showing fluid paths 116 and the stratification point 118. Only four are used in this example but more may be used. When injection is initiated, fuel jets from each orifice travelling along trajectories 116. As the jets travel along trajectories 116, mixing, vaporization and combustion take place. All jets intersect at point 118. In addition to being non-wall wetting, this scheme achieves all of the known benefits of the piston bowl without the bowl.

FIGS. 19 and 20 show another version of the present invention which may be referred to as "the valveless embodiment". As discussed above concerning FIG. 13, fluid injection device 121 is being merely as used as an attachment to a prior art metering means located upstream. Because the regulation of flow of fuel/fluids is upstream, devices 121 and 130 are without valves, micro-injectors. Fluid injecting devices 121 and 130 are multiple fluid devices. For simplicity, each fluid may be separately regulated.

In reference to FIG. 19, two fluids are used (but more may be used). Fluid injection device 121 comprises two SCR's 123 for fluid A and 124 for fluid B. Both of these receive their fluids from corresponding supply lines (not shown). SCR 123 is in fluid communication with passage 125 which in turn is in fluid communication with mixing or atomizing nozzle 127. SCR 124 is in fluid communication with passage 126 which is in fluid communication with nozzle 127. The preferred type of nozzle for this example is shown in FIGS. 10A and 10E. If need be an additional SCR with the corresponding row of spray holes may added; for applications like "Intensified water addition" where its directly injected into the combustion chamber.

Figure 20C:
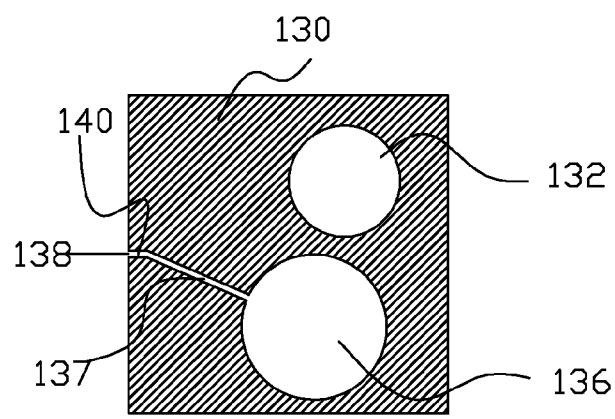

FIG. 20 depicts yet another multiple fluid arrangement. The structure/operation is the same as above except that each SCR 132 and 136 has separate and dedicated spray holes and orifices 134 and 138 respectively. FIG. 20A is a view of a portion of fluid injecting device 130 as viewed from the center of the combustion chamber/squash area showing two of the orifices 134 and 138. 20B is cross section H-H of FIG. 20A. FIG. 20C is cross section K-K of 20A. Fluids are supplied by the corresponding supply lines (not shown) which are in fluid communication with Sub Common Rails 132 and 136. SCR 132 is in fluid communication with passage 133 which in turn is in fluid communication with spray hole 139 whose other end forms orifice 134. In the same way Common rail 136 is in fluid communication with passage 137 which in turn is in communication with spray hole 140 whose other end forms orifice 138. As in previous drawings, if desired, nozzles with the particular desired spray pattern for each fluid may be used in the place of spray holes 139 and 140.

Figure 21:
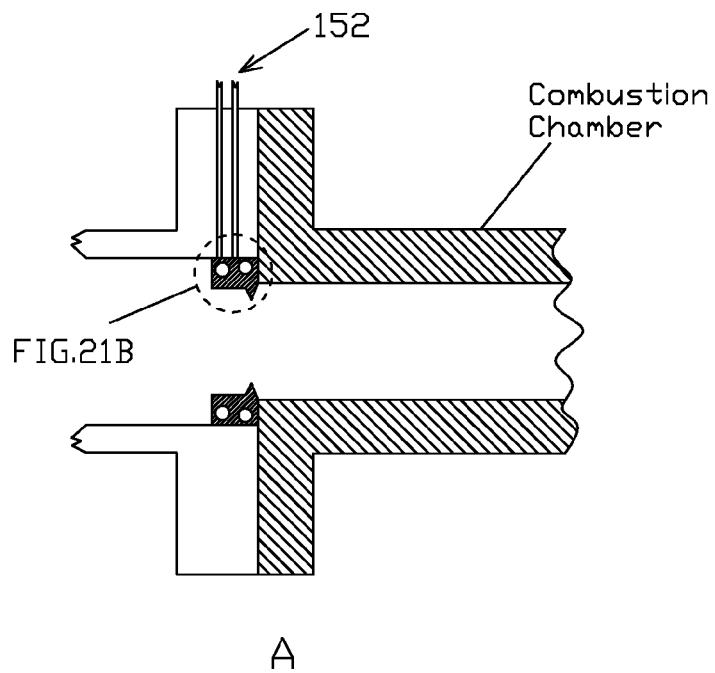
Figure 21:
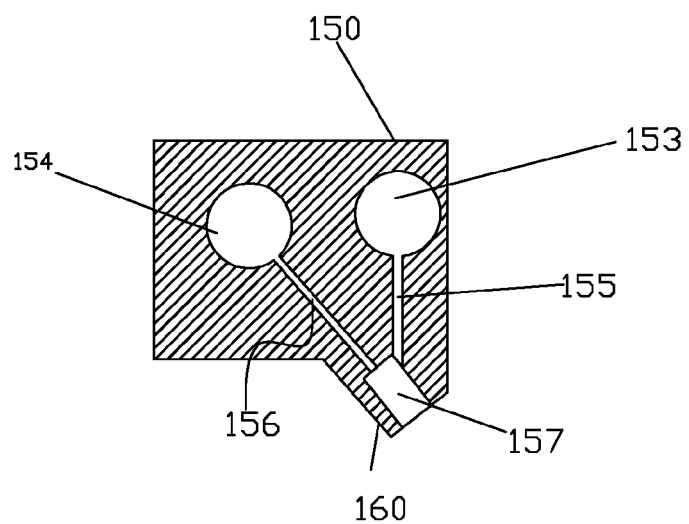

FIG. 21 is depicting the valveless continuous flow version of my fluid injection device demonstrating how Process Intensified Fluid Injection may be incorporated in the constant combustion engines (turbine). Wall integrated Direct Fuel Injection is well known in prior art but still suffers from the above mentioned problems of batch processing. The advantages of PI in terms of mixing make it possible to intimately mix fuel and oxidant into precise ratios which paves the way to high EGR and reduced compression ratios. This embodiment is an improvement of the LDWI injectors of prior art because it eliminates the need for a wide range of mixing enhancement measures most of which are complicated. An example of such injectors is described in U.S. Pat. No. 6,067,790 by Kyung J. Choi and Robert Tacina. The present invention does away with the air swirler and the requirement for the injector to be at a 45 degree angle as prescribed therein.

In reference to FIG. 21B two fluids are used (fuel and oxidizer). As shown, fluid injection device 150 comprises SCR's 153 and 154. SCR 153 is in fluid communication with passage 155 which in turn is in fluid communication with mixing or atomizing nozzle 157. Common rail 154 is in fluid communication with passage 156 which is in fluid communication with atomizing nozzle 157 supplying the second fluid. The mixing nozzle preferred in this drawing in depicted in FIGS. 10A and 10E but other nozzles may be used according to this invention.

APPLICATIONS

The following are exemplary applications of the "Wall Integrated Intensified Fluid Injection method and devices", demonstrating the multi-functionality thereof. Intensified fluid injection opens up numerous possibilities of running IC's which will become apparent to the artisan while executing the examples here in. These are listed individually but combinations thereof are possible.

First Embodiment

Rapid Mass Transfer/Intensified Injection

At their best, prior art injectors dispense relatively large liquid fuel droplets. This is a problem because fuel will not burn in its liquid state. It has to first vaporize and then mix with an oxidant. But to get good droplet distribution and complete phase change, it takes more time than there is at normal engine running conditions. This problem is even more pronounced under acceleration or increased load and it leads to incomplete combustion which results in poor emissions including PM, HCs etc.

At their best, prior art injectors dispense relatively large liquid fuel droplets. But to get good droplet distribution and complete phase change, it takes more time than there is at normal engine running conditions. This is a problem because fuel will not burn in its liquid state. It has to first vaporize and then mix with an oxidant. This problem is even more pronounced under acceleration or increased load and it leads to incomplete combustion which results in poor emissions including PM, HCs etc.

As shown in FIGS. 1, 5 thru 14 and 18 thru 20, wall integrated Intensified Fuel injection solves this problem by increasing and evenly spreading out number of injection sites/spray holes all around the combustion chamber and squash area in particular, each dedicated to cover a smaller space with less volume of fuel to discharge. In FIG. 1 only three spray holes are shown but as many as necessary may be used. The increased number of spray holes and injection sites eliminates the need for deep penetration which usually results in wall wetting.

The high mass transfer rates of the fluid injecting devices herein allow the mixture formation process between fuel and air to be complete before start of combustion. This allows a much later start of injection than heretofore possible and leads to the much desired isobaric heat addition for reciprocating ICEs.

One of the methods to accomplish Rate shaping (besides those in prior art) is to make the micro injectors (e.g. micro-injectors 7 in FIG. 2) to be of varying cracking pressures and arranged in such a way that only certain ones open at certain pressure values. They may also be arranged in order of increasing cracking pressure.

Intensified injection combines all of the benefits and advantages of Spark Ignition and Compression Ignition, and for that reason, this embodiment is a path to the "Ideal IC Engine".

Second Embodiment

Shielded Combustion/Intensified Mixing

This is the "In-cylinder oxidant intensified mixing and combustion" method where the process of combustion is shielded from the atmosphere of combusted gases in the chamber. This embodiment is the same as the preceding embodiment in terms of operation so only the changes are discussed here.

In prior art, the concept of shielding a process from an atmosphere is extensively used in the field of welding. The molten metal is shielded from the atmosphere (or water for underwater welding/cutting) by a pressurized bubble of inert gases provided or created from the heated flux. Also in "oxy-fuel" welding/cutting, fuel and oxygen are kept separate until just before discharge and for "metal pre-heating", fuel and oxygen mix and combust right on the job. But the dimensions and materials of the welding nozzles cannot work and cope with the conditions of internal combustion.

By PI, the present invention applies the "on the spot" mixing inside the combustion chamber as shown in FIGS. 9 and 10. The acts of mixing and combustion are divided up into a multiplicity of smaller ones all around the chamber. The choice of nozzle is dependent on engine size and other factors but preferred nozzles for this application are depicted in 10B, 10C and 10D.

As shown in FIG. 9, SRC 56 and nozzle 63 are added. Oxidant is supplied via SRC 56 and fuel via SRC 53. The preferred types of mixing nozzles are depicted in FIGS. 10C, 10D and 10F. Oxidant is supplied via SRC 56 and fuel via SRC 53.

"Intensified in cylinder fuel/oxidant mixing" neither requires a fresh charge nor high compression ratio for the power stroke. It takes advantage of the heat of the combusted gases to ignite the fuel oxidant mixture. Other applications of this arrangement include Two stroke, SSCIDI (Shielded Stratified Compression Direct Injection) and others will become obvious to the artisan.

Third Embodiment

Control for Start of Ignition for HCCI

The HCCI cycle/engine is known to be highly efficient with low Nox and Particulate Matter (PM), etc. But one of its drawbacks is the difficulty in controlling the start of ignition point especially under increased load.

Due to low mass transfer rates of prior art injectors, to get good homogeneity, fuel injection has to start early, sometimes more than 360 CAD before the power stroke. Intensified injection solves this problem by reducing the mixture formation duration. Any drawings in FIGS. 1, 5 thru 14 and 18 thru 20 may be used in this embodiment depending on engine size, power and other factors.

In this embodiment/example, air is compressed much like the diesel cycle. Because intensified injection is capable to rapidly form a substantially homogeneous mixture within a few CAD near TDC, injection is initiated at a much later time than heretofore practical.

Fourth Embodiment

Low and or No Compression Phase

In this embodiment, PI is used to mix and inject fuel/oxidant; and harness residual heat energy in Exhaust Gases.

As far as IC engines are concerned, a large portion of the loss of the energy content of fuel can be attributed to the compression phase and heat loss via exhaust gases.

By some "estimates", the compression phase consumes 30 to 40% of the energy content of the fuel for reciprocating engines; and up to 60% for turbines. By other estimates, up to 45% of the fuel's energy content is lost through the hot exhaust gases.

There is a need to recover as much of these losses as possible and that's what this embodiment sets out to do.

It's been recognized by the inventor hereof that the "condition" of a charge or working fluid in an IC chamber "just before ignition" is similar to that of an energetic material or explosive charge in many respects. In other words, the charge at that moment is a "quasi-explosive". One of the similarities is the fact that they both comprise both a fuel and oxygen. One of the major differences is that conventional energetic materials ignite without going through the compression phase. I believe the reason for this is the fact that in an explosive charge, the molecules of both fuel and oxygen are extremely proximate. In fact in some energetic materials the fuel and oxidizer are chemically bonded together. The opposite is true for the air/fuel charge at STP. The molecules of both fuel and oxygen are far apart, further separated by such diluents as nitrogen etc.

Accordingly it's believed by the inventor hereof that the operative purpose of the compression phase in an IC engine is to increase the proximity of the molecules of both fuel and oxygen. In gases this proximity is the equivalent of the average bombardment or collusion frequency of the oxygen/fuel molecules. The effect of pressure on the oxygen/fuel mixture is in direct proportion to the average collusion frequency; which in effect is the above mentioned molecular fuel/oxygen proximity.

There are other ways of increasing the collusion frequency without increasing pressure. These include 1: reducing the amount of diluent in the charge and 2: increasing the oxygen content of the charge. These two affect the charge in the same manner as the act of compression. But because they have a long list of deleterious effects, the artisan has settled for the energy intensive compression phase.

This embodiment, seeks to cause a mixture of gases and fuel to assume the above mentioned "quasi-explosive state", by using "Intensified Fluid Mixing" to manually regulate the above mentioned "Fuel/Oxidant Proximity" inside a chamber instead of relying on pressure. This allows any fuel/oxygen ratios (including 1:1) to be used. Intensified mixing results in mixing (hence combustion) zones that are limited to locale and therefore without the problems normally associated with rich oxygen.

According to this invention, intensified fuel/oxidant mixing does not depend on the oxygen of the incoming charge to combust therefore up to 100% EGR may be used. This leads to a higher "recovery" of the residual heat in the combusted gases than ever before possible. As an example, in prior art upon compression, the initial charge temperature at TDC averages 450 degrees C. for CI Engines, which is below the average exhaust temperature of 540 degrees C. With the present invention (using 100% EGR), that is the initial charge temperature (540 degs C. without compression). As can be expected, there is a multitude of advantages that result from this concept for example:

Reciprocating engine; 2 Stroke: On the exhaust stroke, a portion of exhaust gas is retained by closing the exhaust valve before TDC. Then using device 51 (FIGS. 9 and 10B thru 10D), injection of the fuel and oxidant is initiated a few CAD before (or even after) TDC and the mixture is ignited by the heat of the retained exhaust gases. This is because the average temperature of exhaust gas is substantially above that of the auto ignition temperature of most fuel/oxidant mixtures ratios.

Reciprocating engine; 4 Stroke: On the intake stroke, a charge with a high EGR ratio is received thru the intake valve. The temperature of the gas mixture preferably kept above the fuel's auto ignition temperature. On the compression stroke, the exhaust valves are left open until 90 CAD BTDC, thereby reducing the work required for compression. Then using device 51 (FIGS. 9 and 10B thru 10D), intensified injection of the fuel and oxidant is initiated a few CAD before (or even after) TDC and the mixture is ignited by the charge.

There are several alternative ways to accomplish this embodiment depending on the size of engine and other factors. The dual fluid arrangement of FIG. 9 (where oxidant is supplied via line 61 and fuel by line 52), FIG. 18 (oxidant via SCR 123 and fuel 124 or vice versa), and FIG. 19 (fuel via SCR 134 and oxidant SCR 136 or vice versa) may all be used here.

Turbine engines: The turbine starts in the usual way of compressing air and adding fuel to the compressed air in the combustion chamber. At that point, only the fuel SCR (SCR 154 in FIG. 21B) is running injecting fuel to the combustion chamber while oxidant SCR 153 is deactivated. After the engine assumes a predetermined set of operating conditions, a transition to the "Process intensified fuel/oxidant (pre-) mixing and injection" is gradually initiated by steadily pressurizing oxidant SCR 153, and subsequently the localized fuel/oxidant mixing and combustion ensues.

Already that's an improvement over the current turbine engines. But if need be, still another step may be taken to further increase performance. To do this, the compressed air input to the combustion chamber is gradually reduced while increasing IEGR. This is done until the desired EGR ratio. Since the oxygen is supplied locally, (i.e. fuel is mixed with oxidant at the orifice inside the chamber) ratios of 100% EGR are possible.

This invention makes it possible to completely eliminate the compressor for applications that favor less weight and size along with high engine power density etc. In those cases, the starting air may be provided by a detachable separate compressor (or any other means) and then phasing in the PI method as prescribed above.

Provided herein are multiple alternative ways to accomplish this embodiment depending on the size of engine and other factors. The dual fluid arrangement of FIG. 21B (where oxidant is supplied via SCR 153 and fuel by SCR 154 or vice versa) can be used here. Nozzle 157 may be any of those shown in FIG. 10 especially 10E.

Two of the many ways to realize IEGR for a turbine engine, are (1) a simple procedure of partly restricting the flow of the combusted gases as they exit the combustion chamber nozzle; and (2) gas generation rate is such that (To the artisan this is a simple and straight forward modification to a conventional combustion chamber, therefore drawings are not necessary. Likewise the process of reducing the flow of compressed air in to the combustion chamber should be straightforward)

By carefully calibrating fuel/oxidant and EGR ratios, it is possible to increase efficiency of engine by reducing or completely bypassing the compression phase leading to an improved two stroke cycle without the scavenging problems of the conventional two stroke cycle for piston engines. And for turbine engines this leads to a "virtual Rocket Turbine Hybrid".

Special attention should be dedicated to the ratio of oxygen in the oxidant. It should be noted that "Oxygen Balance" is one of the factors that determine several characteristics of an EM factors like energy release rate, power, flame propagation speed etc. And it's been said that an EM is most potent when "Oxygen Balance" is zero. Therefore this ratio which may vary should be selected with care.

The problem of extreme high temperatures which is likely to come about as this embodiment is implemented can easily be resolved by using water emulsified fuels or direct water injection as outlined herein later.

Other advantages and ramifications of "in chamber" oxidant/fuel mixing by PI will gradually become obvious to the artisan during the implementation phase of the present invention.

Fifth Embodiment

Intensified Water Addition

Efforts to use water in ICE efficiency improvement have been ongoing since the advent of the ICE itself. This is because of:

1: the high heat content in ICE exhaust gases and 2: the good properties of water like chemical stability, good expansion ratio and abundance to mention just a few. But the major difficulty of using water in IC engines is its high specific heat capacity which is above most other compounds. And due to stringent emission standards and limits in materials science, ICE technology has been trending towards Low Temperature Combustion in recent decades, further constraining its use in efficiency improvement efforts. Besides when liquid water makes contact with metals it tends to have a corrosive effect, and this is catalyzed by high temperatures.

Intensified water injection of the present invention is compatible with present reciprocating and turbine engines Even though the intensified water injection works well with prior art LTC engines, higher combustion temperatures of the present invention are preferred. The combination of both Oxy-fuel combustion and High IEGR avails extremely high heat in the combustion chamber. The present embodiment seeks to exploit the high heat capacity of water to absorb hence evacuate the readily available heat, while at the same time take advantage of the high expansion ratio of water contribute to the conversion of heat energy to motive power. This contribution serves not only to increase power but also to lower the CO2 emissions per unit distance for vehicular applications, or unit period of operation for stationary plants. The high heat allows water to expand and contribute to the power which in turn leads to less fuel burned, which in turn results in less CO2 emissions. And for turbines, water addition has an additional advantage of increasing the mass of the gases flowing thru the expander.

Due to the availed heat I anticipate water additions with higher water to fuel ratios than currently possible.

Water may be introduced into the chamber under the above mentioned high temperature conditions in two ways. 1: intensified direct water injection and 2: As part of the fuel i.e. water/fuel emulsion.

1: Using intensified direct water injection into the combusted or still combusting gases allows water to immediately turn into dry steam hence no risk of liquid water making contact with engine components.

For reciprocating ICEs an arrangement similar to that of FIG. 9 but with an extra SRC with corresponding spray holes (not shown) may be used. And for turbines, the dual fluid arrangement of FIG. 21B (where oxidant is supplied via SCR 153 and water/fuel emulsion by SCR 154 or vice versa) can be used 2: Water/fuel emulsions and solutions (e.g. wet ethanol) have the advantage that no extra Hardware is required to transport the water since it is part of the fuel. The only requirement is the high temperature hardware of the oxy-fuel combustion preferably in addition to IEGR as described earlier. Preferably the calibrations of the fuel oxidant and EGR ratios are such that the exhaust gas temperatures are less than current engine exhaust temperatures.

Sixth Embodiment

DI Stratification

Stratified Direct Injection has been proposed as potential means of improving the GDI engine. An intrinsic problem with prior art DI injector design is that they dispense fuel from a single point (the injector tip) with (in most cases) a radial spray pattern which makes wall-wetting almost inevitable.

The present invention solves this problem by an "outside in" approach where the fuel jets originate from the wall towards the center of the chamber as shown in FIG. 18. For simplicity only four spray holes shown but more may be used.

The holes are arranged in a way such that their jets (or fluid trajectories) intersect at select points in the squash area e.g. near the spark plug for SGDI (Stratified Gasoline Direct Injection). For CI this point may be the center of the squash area or inside the piston bowl. This stratification method has another advantage when used in RCCI in that second fuel is stratified in the center of the chamber and away from cylinder walls.

Seventh Embodiment

Species Stratification

One of the proposed ways to extend the Load range of the HCCI engine is the stratification of the species or contents of the charge. In prior art, once the cylinder valves close, there is no effective method for manipulating or rearranging the species of the charge. As shown in FIGS. 15-17, the present invention provides a way to determine the placement of different species of the charge even after valves closure.

In this example, the apparatus 101 is used as an "in Cylinder Mixture Control means" where a first fluid 108 (the core) made up of a homogeneous air/fuel mixture is surrounded a second fluid 109 which is dissimilar in species forming an outside layer.

As a homogeneous charge (made conventionally i.e. DI, PFI, etc) is compressed, a second gas is injected into the chamber by device 101. As shown, spray holes 106 are aimed away from the center of the chamber and towards the cylinder wall at angle "X" with respect to the axis of spray hole 105. FIG. 17 shows the desired placement of the species. It is preferred that the chamber have as few sharp edges as possible in order to minimize turbulence. Piston crown 110 is depicted here with a spherical depression in the center to aid in that regard.

Eighth Embodiment

Thermo Stratification

Another method that's been proposed for extending the load range of the HCCI engine is the thermo stratification of the charge. In this embodiment a homogeneous charge is split into two portions. The first portion is admitted thru the intake valves and the second portion is pumped through the fluid supply line to device 101 (FIGS. 15-17). If need be, the second portion may be routed thru a suitable cooling means to increase the temperature differential. Thus the chamber is charged with a homogeneous charge with two layers at different temperatures.

Ninth Embodiment

Fuel Pre-Heating

The location of the fluid injection device (FIG. 3) may be optimized to control the temperature of the fuel in order to further improve mixing efficiency and homogeneity. The engine block or cylinder head is kept at such temperatures that upon injection, the fuel instantly vaporizes.

This may be done by routing the cooled engine coolant thru the cylinder head with additional passages and regulating temperature of cylinder head and the fluid injecting device in particular, and maintaining it within a predetermined range depending on the kind of fuel thereby allowing even the heavy oils to be more readily combustible.

There are several applications of fuel preheating according the present invention including:
1: "Diesel HCCI". The preheating of diesel oil makes it easier to use in the HCCI.
2: Makes possible the "Diesel Otto engine". This is the spark ignited diesel engine. After the engine gets to the temperature that allows the diesel oil to vaporize upon injection, it assumes the spark ignited diesel operation where diesel oil is injected during the intake stroke and vaporizes and spark ignited after compression.

3: Multi Fuel Application. Fuel Preheating allows the engine to use multiple fuels. By determining the fuel properties (e.g. viscosity), the ECM controls the temperature of the fuel in the above described manner to match the best possible combustion characteristics.

Temperature control is critical in this embodiment because above a certain point pyrolysis and caulking problems may occur. Another cooling measure that may be considered is the use of the fuel itself as a coolant, by allowing cooled incoming fuel to run thru the fluid injecting device during the inactive periods. In prior art this "bypass" technic is used in Cam driven Unit Injectors. In this case this bypass functions mainly as a cooling measure.

Tenth Embodiment

Staged Oxidation

The Wall integrated Fluid Injection also provides another means to PPC (Partially Premixed Combustion). As in FIG. 9 (using any nozzle e.g. 10D), an oxidizing fluid is supplied by SCR 56 with 5-6% or more by weight and the rest of the oxygen supplied by the air (gas) in the squash area. The fluid in SCR 56 may be recycled exhaust gas to which oxygen is added. After the compression stroke, injection is initiated and micro valve 27 opens and fuel and oxidant are partially mixed in the nozzle and then get discharged into the combustion chamber. For CI the mixture ignites by the heat of the compressed charge and the rest of the fuel reacts with the oxygen the charge. For SI, the charge is ignited by the spark plug. This embodiment is compatible with both two and four stroke Cycles.

Eleventh Embodiment

Micro Auxiliary Chambers

One of the disadvantages of pre-chambers is uneven heat distribution throughout the chamber. This embodiment solves this problem by using multiple small pre-chambers evenly spread out around the combustion chamber. The auxiliary chambers are part of the micro nozzles as shown in FIG. 10F. To start injection, fuel and oxidant are simultaneously injected into the micro chambers 68 and the heat of the gases in the micro chambers ignites the fuel oxidant mixtures inside the micro chambers, expansion ensues and the reactants get ejected into the main chamber where additional combustion takes place.

Twelfth Embodiment

Staged Combustion

Another application for the micro chambers is to assist in the staged combustion process. This example uses the same drawings as the preceding one. The oxidant supplied via passage 63C may be diluted by other gases (e.g. EGR) so that only partial combustion takes place in the auxiliary chambers and is completed in the main chamber (squash area).

It is needless to mention that for all applications where combustion (at least partially) takes place in the fluid injecting device, heat buildup ensues around the micro-chambers. An easy solution for this is intensified cooling i.e. taking advantage of the high heat evacuation rates of intensified cooling. That entails cooling SCR's (not shown) which is dedicated to regulating the temperature of the fluid injecting device(s).

GENERAL NOTES

This description is generic in nature therefore it is (along with the drawings) exemplary and is only meant to convey the concept of Process intensified operations for IC Engines but not meant to be limiting in any way.

In this description whenever the term "Spray hole" is used, parameters that influence spray pattern and spray penetration like length to diameter ratio, taper of each hole, all may be considered.

As used herein, the acronym "SCR" stands for "Sub Common Rail" which refers to a common rail system that's dedicated to a single combustion chamber. It is an annular fluid passage forming a closed loop which fluidly communicates with a multiplicity of spray holes, micro injectors or nozzles, all supplying fluid(s) to a common combustion chamber.

As used herein, the term "oxidant" represents any fluid mixture whose oxygen content is anywhere between 22 and 99%. Substantially pure oxygen is much cheaper to obtain as of late and prior art is replete with methods of providing the same for combustion processes.

Some embodiments herein use much smaller orifice diameters than those in prior art, and small diameter orifices and passages are susceptible to clogging problems. These are mainly caused by incomplete combustion. The complete combustion which is an intrinsic part of this invention helps avoid this problem.

What is claimed is:

1. A sub common rail system comprising:
   (a) a fluid injecting device disposed around a combustion chamber
   (b) at least one annular fluid passage disposed in said fluid injecting device adapted to receive a fluid at a predetermined pressure; and
   (c) a multiplicity of fluid atomizing devices in fluid communication with said annular fluid passage, oriented to direct fluid jets inwards towards a center of said annular, said fluid atomizing devices being spaced in a selected pattern;

whereby said fluid jets and a subsequent gas phase advance way from an inside wall towards a center of the annular fluid passage.

2. The system of claim 1 further comprising a return fluid passage in fluid communication with a low pressure fluid passage of each of said fluid atomizing devices and said return fluid passage being in fluid communication with a control valve which is used to hydraulically actuate said fluid atomizing devices.

3. The system of claim 2 wherein said control valve is electronically activated.

4. The system of claim 3 incorporated into a combustion chamber of a reciprocating engine, wherein said fluid atomizing devices are oriented to discharge fluids into a squash area of said combustion chamber.

5. The system of claim 4 wherein said fluid atomizing devices are adapted to discharge fluid along cylinder wall of the combustion chamber and away from the center of said annular body so as to facilitate charge stratification for improved control of homogeneous charge compression ignition.

6. The system of claim 1 incorporated in a combustion chamber of a turbine engine and wherein the multiplicity of fluid atomizing devices are on the air intake side of the combustion chamber, and jets from said multiplicity of fluid atomizing devices advance towards the center of said combustion chamber.

7. A method for intensifying fluid injection into a combustion chamber comprising the steps of:
   (a) providing a combustion chamber;
   (b) providing at least one annular fluid passage adapted to receive fluid at a predetermined pressure; and
   (c) providing a plurality of fluid atomizing devices in fluid communication with said annular fluid passage at select locations around said combustion chamber for discharging said fluid into a said combustion chamber whereby an interfacial surface area between said fluid and volume of said combustion chamber is substantially increased and the rate of mixture formation substantially reduced.

8. The method of claim 7 wherein a first fluid and a second fluid being fuel and oxidant respectively are supplied to corresponding said annular fluid passages and fluid atomizing devices respectively and mixed at predetermined ratios preferably before issuing from each of said fluid atomizing devices and more preferably in a near field of fluid atomizing devices so as to facilitate localized oxyfuel combustion.

9. The method of claim 8 wherein the fuel is emulsified with water and wherein the water to fuel ratio is high enough to reduce the heat of the oxyfuel combustion while adding to a force of a working fluid.

10. The method of claim 8 further comprising a fluid passage and corresponding fluid atomizing devices for injection of a diluent fluid at such pressure or intervals that the diluent fluid is vaporized in the near field of each of the fluid atomizing devices and absorbs a substantial amount of waste heat and adds to the overall expansion and mass of the working gas.

11. The method of claim 10 wherein the diluent fluid is water.

12. The method of claim 8 further including a process for condensing and reusing the water.

13. The method of claim 7 wherein a percentage of internally recirculated exhaust gas is above 16% and oxygen content in the oxidant is between 21% and 99% whereby the energy required for a compression phase and oxides of nitrogen in the exhaust gas are reduced substantially.

14. The method of 7 claim incorporated in a reciprocating engine wherein said fluid atomizing devices are oriented to discharge fluids into a squash area of said combustion chamber.

15. The method of claim 7 incorporated in a combustion chamber of a turbine engine and wherein the multiplicity of fluid atomizing devices are on the air intake side of the combustion chamber, and jets from said multiplicity of fluid atomizing devices advance towards the center of said combustion chamber.

* * * * *